US012581039B2

(12) United States Patent
Imai

(10) Patent No.: US 12,581,039 B2
(45) Date of Patent: Mar. 17, 2026

(54) SYSTEM AND CONTROL METHOD OF SYSTEM

(71) Applicant: CANON KABUSHIKI KAISHA, Tokyo (JP)

(72) Inventor: Yasuhiro Imai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/602,277

(22) Filed: Mar. 12, 2024

(65) Prior Publication Data

US 2024/0333877 A1 Oct. 3, 2024

(30) Foreign Application Priority Data

Mar. 28, 2023 (JP) ................................. 2023-051073

(51) Int. Cl.
*H04N 7/15* (2006.01)
(52) U.S. Cl.
CPC .................................... *H04N 7/157* (2013.01)
(58) Field of Classification Search
CPC ..................................................... H04N 7/157
See application file for complete search history.

(56) References Cited

U.S. PATENT DOCUMENTS

2021/0377062 A1* 12/2021 Stevens ................. H04M 3/564
2022/0124286 A1* 4/2022 Punwani ............. H04L 65/1069

FOREIGN PATENT DOCUMENTS

JP 2023-55399 A 4/2023

OTHER PUBLICATIONS

U.S. Appl. No. 18/611,869, filed Mar. 21, 2024 by Yasuhiro Imai.

* cited by examiner

*Primary Examiner* — Amal S Zenati
(74) *Attorney, Agent, or Firm* — VENABLE LLP

(57) ABSTRACT

A system configured to manage a virtual space in which a plurality of user avatars can exist comprises a providing unit configured to provide a plurality of options for the movement of a user avatar within the virtual space, and a moving unit configured to move the user avatar to another location within the virtual space according to a selection from the plurality of options, wherein the plurality of options includes at least a movement that specifies a predetermined location, and a movement that specifies another user avatar.

14 Claims, 25 Drawing Sheets

SYSTEM AND CONTROL METHOD OF SYSTEM

BACKGROUND OF THE INVENTION

Field of the Invention

The present invention relates to a system and a control method of the system for a user avatar to access other user avatars within a virtual space.

Description of the Related Art

There are technologies such as virtual reality, augmented reality, and mixed reality that create spaces that provide simulated experiences by merging the real and virtual worlds. Virtual reality is abbreviated as "VR". Augmented reality is abbreviated as "AR". Mixed reality is abbreviated as "MR". Furthermore, as a general term for these, "XR" is gaining attention, and various standardization efforts are being made.

In addition, in recent years, virtual spaces and services that utilizes such technologies have been referred to as the "metaverse," and have come to be used not only for entertainment purposes such as games but also in business settings such as virtual offices and VR meeting rooms.

In a virtual space, each user wears an HMD. HMD is an abbreviation for "Head Mounted Display". A user, via the HMD, acts as an avatar in the virtual space and performs communication with avatars of other users. In a case in which a plurality of avatars in a virtual space gather together for a conversation, a meeting, a class, or the like, similar to the real world, the user moves the avatar to a specific location in the virtual space or accesses another designated virtual space such as an online conference system.

Conventionally, to move an avatar that is in a certain virtual space to another virtual space, an object is disposed as a portal (window) for the purpose of moving. Thereby, an avatar can easily move between a plurality of virtual spaces via the portal (refer, for example, Japanese Patent Application No. 2021-164754).

In a virtual space, it is troublesome to move an avatar by making the avatar walk around to a specific place, or to search for another avatar during movement. In addition, an avatar user may become lost in the virtual space, or may not be able to find the desired counterpart (avatar) in an area crowded with people. Because an avatar may appear different from the actual appearance, it is more difficult to identify a specific person in such crowded areas than in the real world. Furthermore, a method of gathering in a different virtual space, such as an online meeting system, is not suitable for convening in a casual setting, like a conversation at a watercooler (a casual, stand-up meeting). For example, there exist cases in which two avatars, encountering each other by chance in the hallway of a virtual office, desire to call another avatar to that location. However, in a case in which the meeting place and meeting time have not been decided beforehand, it has been difficult for avatars to easily gather together in a virtual space.

SUMMARY OF THE INVENTION

The present invention has been made in consideration of the above-described problems and provides a system in which avatars can easily gather together in a virtual space.

The system in the present invention is a system configured to manage a virtual space in which a plurality of user avatars can exist, comprising a memory storing instructions and a processor executing the instructions causing the system to provide a plurality of options for the movement of a user avatar within the virtual space, and moving unit configured to move the user avatar to another location within the virtual space according to a selection from the plurality of options, wherein the plurality of options includes at least a movement that specifies a predetermined location, and a movement that specifies another user avatar.

Further features of the present invention will become apparent from the following description of exemplary embodiments with reference to the attached drawings.

DESCRIPTION OF THE EMBODIMENTS

First Embodiment

Hereinafter, an embodiment for implementing the present invention will be explained with reference to the drawings. It should be noted that the embodiment below is not intended to limit the scope of the claims of the invention and that not all combinations of features explained in this embodiment are essential to the technical solutions of the invention.

Figure 1:
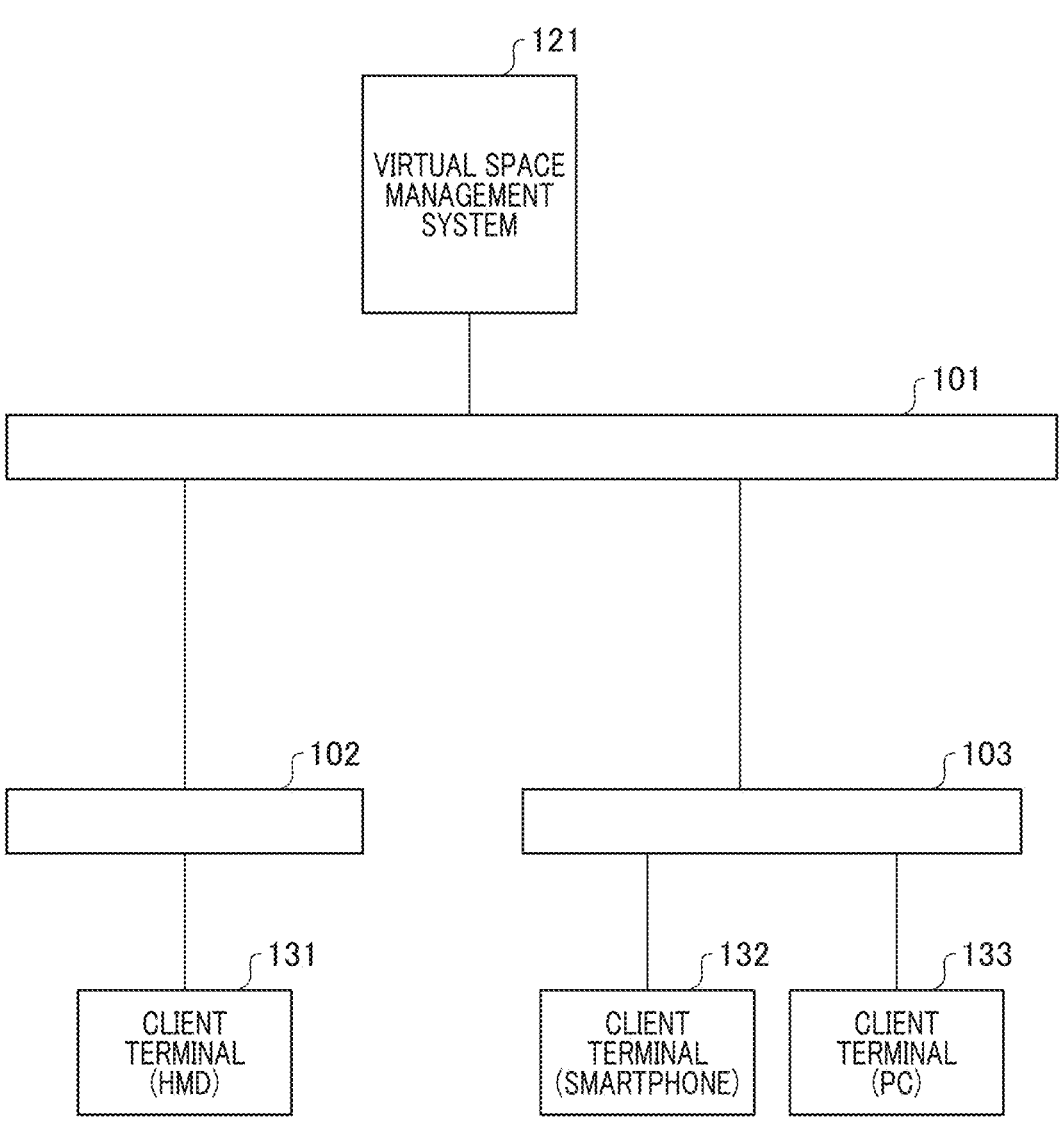
FIG. 1 is a diagram showing an overall configuration of a virtual space management system in a First Embodiment.

FIG. 1 is a diagram showing an overall configuration of a virtual space management system in a First Embodiment. The virtual space management system of the present embodiment is a system that manages a virtual space in which a plurality of user avatars can exist. In FIG. 1, a virtual space management system 121 and client terminals 131 to 133 are connected via networks 101 to 103.

Each of the networks 101 to 103 are so-called communication networks. These communication networks are realized, for example, by one of a Local Area Network (LAN) such as the Internet, a Wide Area Network (WAN), a telephone circuit line, a dedicated digital circuit line, an Asynchronous Transfer Mode (ATM), a frame relay circuit line, a cable television circuit line, or a radio circuit line for data broadcasting. The networks 101 to 103 only need to be capable of transmitting and receiving data. In the present embodiment, network 101 is the Internet, while networks

102 and 103 are the Internet, networks within ordinary homes or companies, or wireless LANs set up in urban areas.

Each of the client terminals 131 to 133 is, for example, dedicated hardware capable of rendering a virtual object used in cross reality (XR), such as a Head-Mounted Display (HMD) or smart glasses, or a portable telephone incorporating an execution environment for programs, such as a smartphone. HMD is an abbreviation for "Head Mounted Display". Each of the client terminals 131 to 133 is provided with a camera for capturing images of the surrounding area, and a display for displaying by rendering virtual objects and avatars in a virtual space. In a case in which the client terminals 131 to 133 are not dedicated hardware such as a smartphone, the above-described rendering is performed by using a Web browser or an Application Programming Interface (API) provided by an operating system (OS). API is an abbreviation for "Application Programming Interface".

The virtual space management system 121 is a system for providing a user interface (UI) to each of the client terminals 131 to 133 for the virtual objects and avatars within the virtual space and the position information thereof, and for performing various settings. Here, because an avatar is a part of the virtual objects, hereinafter, when there is no need to explicitly specify an avatar, the term "virtual object" will be denoted.

In addition, the virtual space management system 121 also performs the management of users utilizing the client terminals 131 to 133. That is, the virtual space management system 121 receives a login/logout request from the client terminals 131 to 133 and performs login/logout processing. The virtual space management system 121 is built by using a server computer. Alternatively, the virtual space management system 121 can be built by adopting technologies such as cloud computing.

The functions of a server explained in the present embodiment may be realized by a single server or a single virtual server, or by a plurality of servers or a plurality of virtual servers. Alternatively, a plurality of virtual servers may be implemented on a single server.

Figure 2:
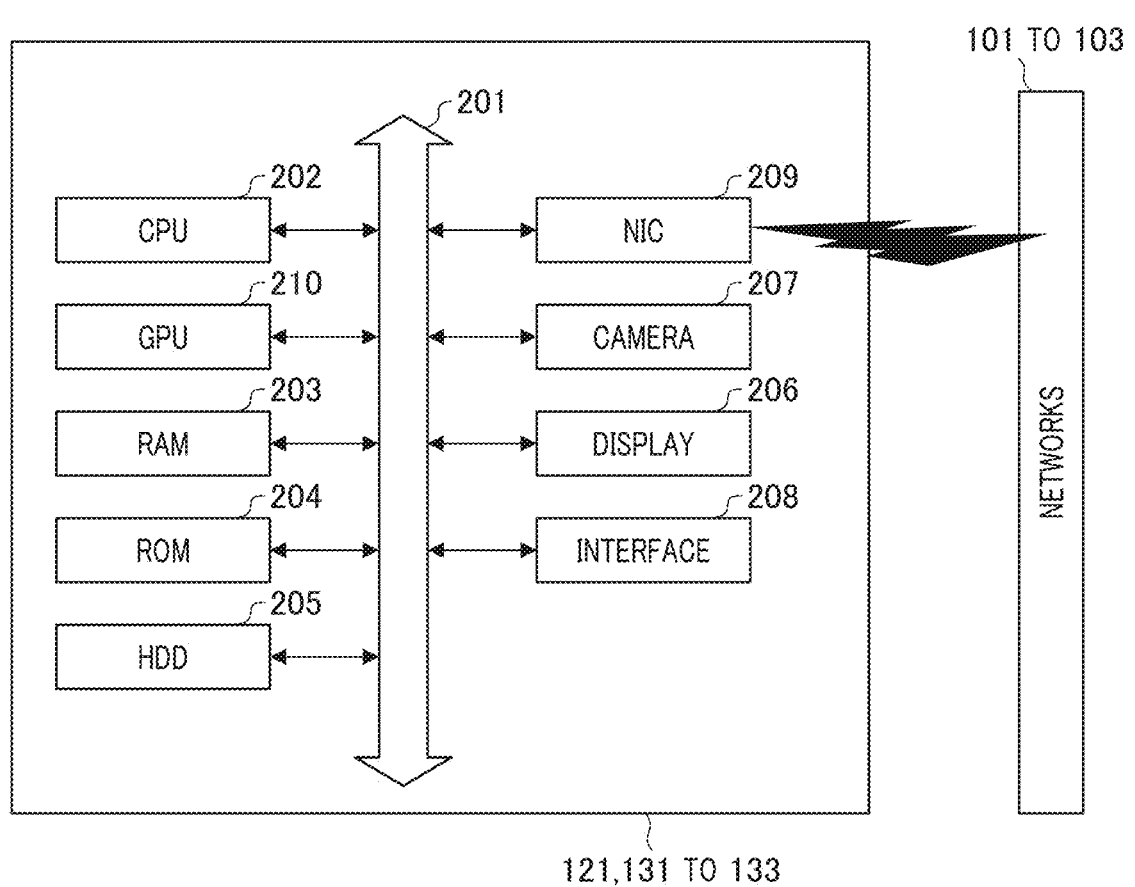
FIG. 2 is a hardware configuration diagram of a server computer and client terminals that configure the virtual space management system in the First Embodiment.

FIG. 2 is a hardware configuration diagram of a server computer and client terminals 131 that configure the virtual space management system 121 in the First Embodiment. In FIG. 2, a CPU 202 performs control of an entire apparatus. CPU is an abbreviation for "Central Processing Unit". The CPU 202 executes application programs, an OS, and the like stored in an HDD 205. HDD is an abbreviation for "Hard Disc Drive". In addition, control is performed so as to temporarily store information and files necessary for the execution of programs in a RAM 203. RAM is an abbreviation for "Random Access Memory". A GPU 210 performs calculation processing necessary for drawing of a virtual object in real time. GPU is an abbreviation for "Graphics Processing Unit". A ROM 204 is a storage unit, and internally stores various data such as basic I/O programs. ROM is an abbreviation for "Read Only Memory". The RAM 203 is a temporary storage unit and functions as the main memory for the CPU 202 and the GPU 210, a work area, and the like. The HDD 205 is one of an external storage unit and functions as a large-capacity memory, storing application programs such as a web browser, programs of a service server group, an OS, and related programs.

A display 206 is a display unit for displaying virtual objects, information required for operation, and the like. In addition, the display 206 may also be an apparatus provided with a function to accept an operation instruction from a user, such as a touch panel. An interface 208 is an external apparatus interface (I/F) to connect to peripheral apparatuses, such as various kinds of external sensors. A camera 207 is an out-camera for capturing an image of the surrounding area or an in-camera mainly for capturing an image of the user on client terminals 131 to 133.

In client terminals 131 to 133, an image captured by the camera 207 (particularly an out-camera) is analyzed by a program stored in the HDD 205, and it is possible to synchronize the movements of a finger or fingers in the real space with a finger or fingers of the user avatar in the virtual space. In a case in which the client terminal 131 is an XR-dedicated terminal, such an HMD, it becomes possible for the user to operate the virtual object displayed on the display 206 by a finger or fingers recognized by the camera 207. In a case in which the client terminal 132 is not an XR-dedicated terminal, such as a smartphone, the virtual object displayed on the display 206 can be operated by using the touch panel of the display or the like.

The virtual object management system 121 does not necessarily require the camera 207. By recognizing a finger or fingers of the user in the real space by the camera 207, it is possible to operate a virtual object within the virtual space and to make contact with other avatars. However, by operating a dedicated controller connected to the interface 208, it is possible to realize the equivalent functionality for manipulating virtual objects within the virtual space and for making contact with other avatars.

A system bus 201 controls the flow of data within the apparatus. A NIC 209 performs data exchanges with external apparatuses via interface 208 and networks 101 to 103. NIC is an abbreviation for "Network Interface Card". It should be noted that the above-described computer configuration is merely one example and is not limited to the configuration example of FIG. 2. For example, the storage locations for data and programs can be changed according to the features thereof to the ROM 204, the RAM 203, and the HDD 205. In addition, by executing processing based on programs stored in the HDD 205 by the CPU 202 and the GPU 210, the processing in the software configuration as shown below is realized. Next, the software configuration of the virtual space management system 121 and the client terminals 131 to 133 according to the present embodiment will be explained by using FIG. 3 through FIG. 11.

Figure 3:
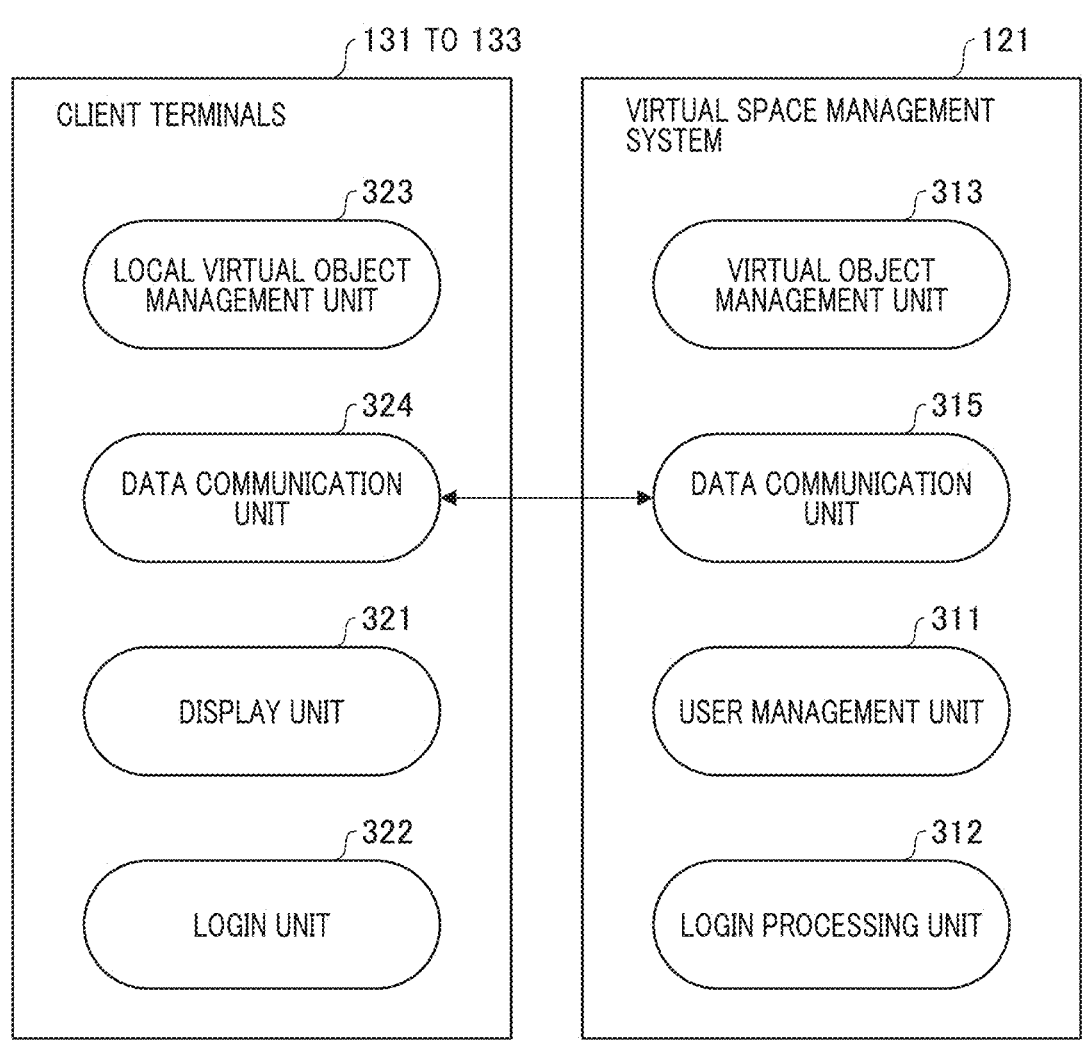
FIG. 3 is a software configuration diagram of the virtual space management system in the First Embodiment.

FIG. 3 is a software configuration diagram of the virtual space management system 121 in the First Embodiment. In FIG. 3, the software configuration, which extracts functions related to the present embodiment within the virtual space management system 121, client terminals 131 to 133, and a function provision service, is explained.

The virtual space management system 121 is provided with a user management unit 311, a login processing unit 312, and a data communication unit 315 as user management functions. In addition, the virtual space management system 121 is provided with a virtual object management unit 313 as a basic function to provide a virtual space. The user management unit 311 manages user information and login information. The login processing unit 312 receives a login request from client terminals 131 to 133, compares the request with the information of the user management unit 311, and returns a login processing result to client terminals 131 to 133. Table 1 is an example of a user information management table for users managed by the user management unit 311.

TABLE 1

| User Information Management Table | | | | |
| --- | --- | --- | --- | --- |
| User ID | User Name | Password | Login Status | Login Expiration |
| userA | Taro | ********* | on | 2022/12/31 0:00 |
| userB | Jiro | ********* | on | 2022/12/31 0:00 |
| userC | Hanako | ********* | off | — |
| . | . | . | . | . |
| . | . | . | . | . |
| . | . | . | . | . |

In Table 1, the "User ID" column is an ID that uniquely identifies a user. The "User Name" column is the name of the user and can be freely set as a nickname or other name. The "Password" column is the basic authentication password used at the login time of the User ID. The "Login Status" column indicates the login status of a user, wherein "on" indicates a logged-in state, and "off" indicates a logged-out state. The "Login Expiration" column indicates the expiration of an authentication state of a logged-in user.

The login processing unit 312 compares the combination of User ID and Password included in the login requests from the client terminals 131 to 133 with Table 1. If the combination of User ID and password matches, the login processing unit returns the login result as successful to each client terminal.

The virtual object management unit 313 manages the 3D data of virtual objects that are disposed within the virtual space, and the like, and provides the managed 3D data to the client terminals 131 to 133 via the data communication unit 315. Table 2 below shows an example of data of each virtual object managed by the virtual object management unit 313.

TABLE 2

| Virtual Object Management Table | |
| --- | --- |
| Virtual Object ID | Virtual Object Data |
| userA | userA.obj |
| userB | userB.obj |
| userC | userC.obj |
| objectA | aaa.obj |
| SystemA | system.obj |
| . | . |
| . | . |
| . | . |

In Table 2, the "Virtual Object ID" column is an ID that uniquely identifies a virtual object in the virtual space. The "Virtual Object Data" column is data of 3D models of various formats. Here, in a case in which the virtual object is an avatar of a user, in the present embodiment, the User ID of the User Information Management Table (Table 1) is denoted as the Virtual Object ID. As another example, the Virtual Object ID may be managed as an independent ID separate from the User ID, and a Virtual Object ID column may be added to the User Information Management Table (Table 1) and managed in association with the User ID. In addition, a User ID column may be added to the Virtual Object Management Table (Table 2) and managed in association with the Virtual Object ID, or a separate table may be prepared so as to associate and manage the User ID column and the Virtual Object ID column.

In addition, the virtual object management unit 313 manages the position information of a virtual object. Table 3 below shows an example of the position information for each virtual object managed by the virtual object management unit 313.

TABLE 3

Virtual Object Position Information Management Table

| Virtual Object ID | Space ID | Main Coordinates | Left-Hand Coordinates | Right-Hand Coordinates |
|---|---|---|---|---|
| userA | roomA | (100, 100, 5) | (100, 98, 5) | (100, 102, 5) |
| userB | roomA | (100, 104, 5) | (100, 102, 5) | (100, 106, 5) |
| userC | roomB | (200, 206, 5) | (200, 202, 5) | (200, 206, 5) |
| objectA | roomA | (99, 100, 5) | — | — |
| SystemA | roomA | −9, 989, 991, 000 | — | — |
| . | . | . | . | . |
| . | . | . | . | . |
| . | . | . | . | . |

The Virtual Object ID column is an ID that uniquely identifies a virtual object. The Space ID column is an ID that uniquely identifies a virtual space. The Main Coordinates column is information that indicates the current position (centroid) of the virtual object. The Left-Hand Coordinates column and Right-Hand Coordinates column are information that indicates the position of the left hand and right hand of the avatar, in a case in which the virtual object is an avatar. The virtual object management unit 313 receives position information when there is a change in the position of virtual objects within the virtual space by the operation of client terminals 131 to 133, or periodically. The virtual object management unit 313 receives position information from client terminals 131 to 133 via the data communication unit 315. The virtual object management unit 313 provides position information of virtual objects and avatars within the virtual space to client terminals 131 to 133 via the data communication unit 315.

Next, a software configuration of client terminals 131 to 133 will be explained with reference to FIG. 3. Client terminals 131 to 133 are provided with a display unit 321, a login unit 322, a local virtual object management unit 323, and a data communication unit 324.

The display unit 321 displays virtual objects within virtual space via the display 206. The display unit 321 displays movements and changes of virtual objects within the virtual space acquired from the virtual space management system 121 in real-time on the display 206.

The login unit 322 transmits the username and password, input either through a finger or fingers captured by the camera 207 or through input devices connected to the interface 208, to the login processing unit 312. It should be noted that an authentication method for the virtual space management system 121 may be face authentication by a face image captured by the camera 207, iris recognition through iris authentication, or fingerprint authentication using a fingerprint sensor connected to the interface 208, and the like.

The local virtual object management unit 323 manages information such as 3D data of virtual objects (Table 2) acquired from the virtual space management system 121 via the data communication unit 324 on client terminals 131 to 133. The local virtual object management unit 323 also manages the position information of a virtual object within the virtual space shown in Table 3 acquired from the virtual space management system 121. The local virtual object management unit 323 detects changes in the position of the virtual object on the local terminal due to operations by the client terminals 131 to 133, and also has the function of storing position information within the local virtual object management unit 323 itself. The local virtual object management unit 323 transmits the position information of an avatar in a case in which there has been a change in the position information within the virtual space due to operations on client terminals 131 to 133, or periodically. The local virtual object management unit 323 transmits the position information of an avatar to the virtual object management unit 313 via the data communication unit 324. The local virtual object management unit 323 stores the position information of a virtual object by periodically acquiring the position information from the virtual object management unit 313 via the data communication unit 324.

FIG. 4A through FIG. 6 are display image diagrams on a client terminal when selecting a movement or invitation of an avatar as a method of accessing another user on a client terminal in the First Embodiment. FIGS. 4A through 6 show screen operations on the display 206 of an HMD-type client terminal 131 for a case in which, within the virtual space, a user accesses another user by specifying and either moving to or inviting the avatar of the other user.

Figure 4A:
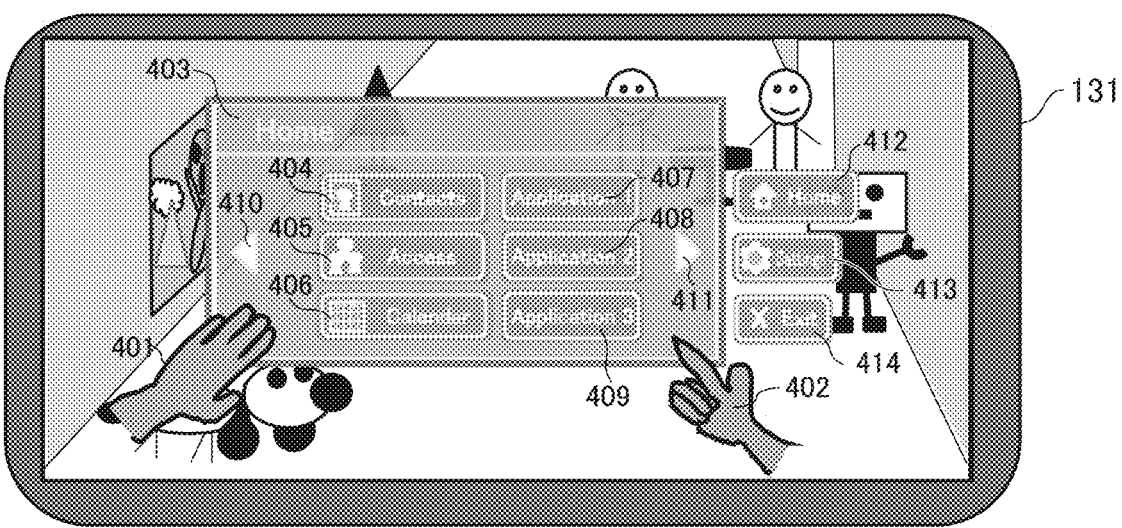
FIGS. 4A and 4B are display image diagrams on a client terminal when selecting a movement or invitation of an avatar as a method of accessing another user on a client terminal in the First Embodiment.

FIG. 4A shows a home screen 403 on the display 206 of the client terminal 131. The home screen 403 displays each application 404 to 409. For example, there is a contacts application 404 that enables the user to edit and reference the contact information of another user, an access application 405 for accessing (contacting) another user, and a calendar application 406 for editing and managing an own schedule. The user can utilize the functions of each application by pressing the desired applications 404 to 409. By using a left transition button 410 or a right transition button 411, the user can transition the displayed screen area of applications within the home screen 403 to the left or to the right, and display applications other than applications 404 to 409 (not shown).

Screen operations such as button pressing or changing of the display position are performed by fingers 401 and 402 of the user avatar, which are synchronized with the real-world fingers of the user detected by the camera 207. In addition, the display of the home screen 403 in FIG. 4A can be displayed by a specific gesture made by fingers of the above-described user avatar. Furthermore, a home button 412, a settings button 413, and an exit button 414 are provided next to the home screen 403. These buttons 412 to 414 are disposed at the side of the screen as buttons that are always displayed, even after transitioning from the home screen 403 to another screen. The home button 412 is a button that enables the user to return directly to the home screen, even when on another screen. The settings button 413 performs settings related to each application 404 to 409, network settings, date and time settings, and the like.

Figure 4B:
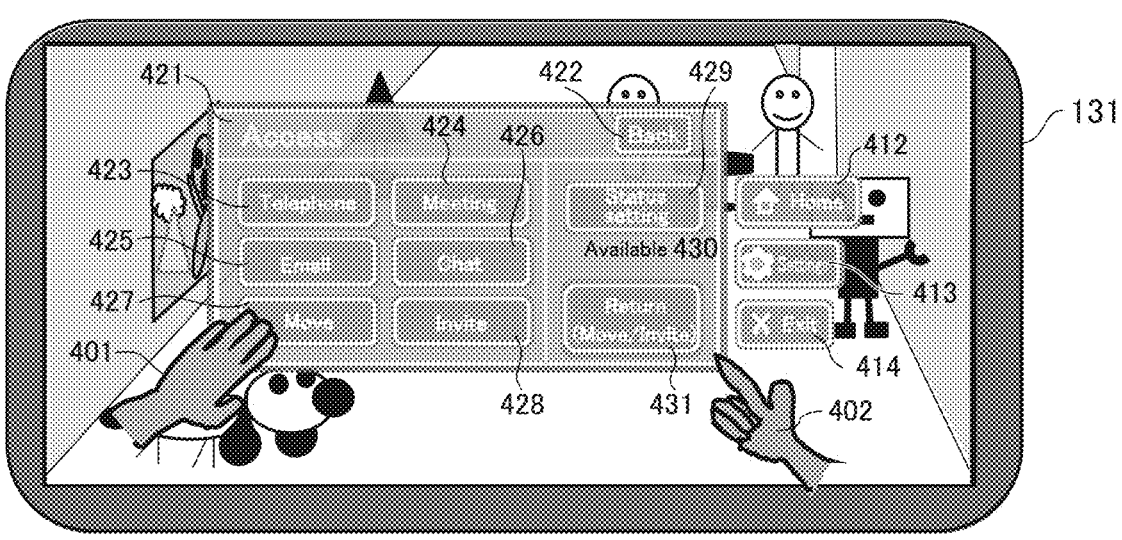

FIG. 4B is an access screen 421 transitioned to by pressing the access application 405 on the home screen 403. The access screen 421 further includes various applications for accessing (contacting) another user. For example, there is a telephone application 423 for making telephone calls, a meeting application 424 for opening meetings, an email application 425 for sending emails, a chat application 426 for chatting, and the like. Furthermore, there is a move application 427 for moving the self-avatar to a specified location or to the location of the avatar of another user and an invite application 428 for inviting the avatar of another user to a specified location or to the location of the self-avatar.

In addition, there is a status display 430 that indicates the current status of the user (in the illustrated example, the status is "available"), and a status setting button 429 to set or change the current status. A "return (move/invite)" button 431 enables the self-avatar to return to the location the self-avatar was at before moving by the above-described move application 427. This "return (move/invite)" button 431 also enables the self-avatar to return to the location at which the self-avatar was at before the movement, in a case in which the self-avatar has been invited to the location of the avatar of another user due to an invitation from the other user. A back button 422 is a button for returning to the screen before transitioning to the access screen 421 (that is, the home screen 403).

Figure 5A:
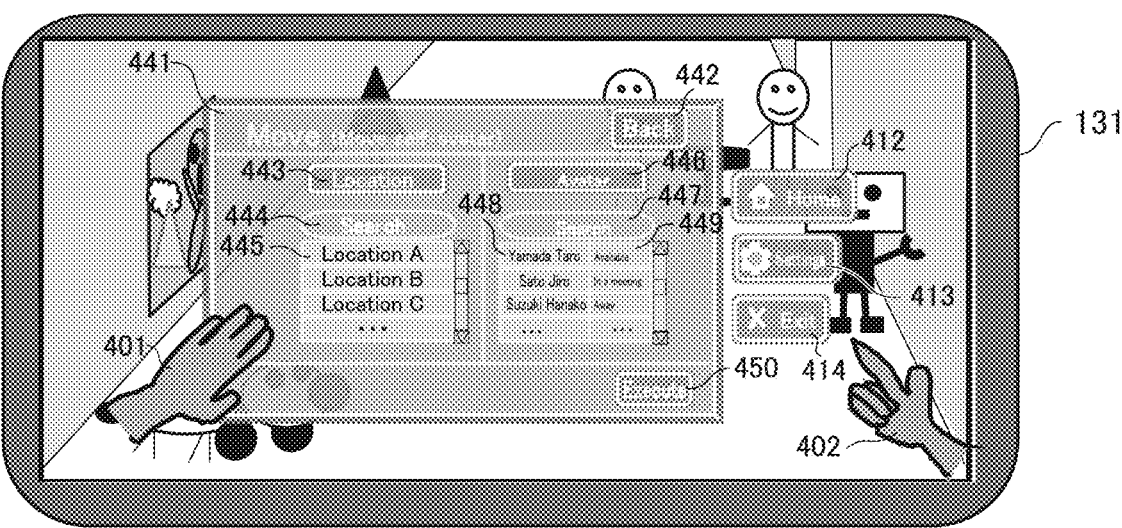
FIGS. 5A and 5B are display image diagrams on the client terminal when selecting the movement or invitation of an avatar as a method of accessing another user on the client terminal in the First Embodiment.

FIG. 5A is a move screen 441 that is transitioned to by pressing the move application 427 on the access screen 421. The move application 427 moves the self-avatar, and in a case in which the move is to a specified location, a location button 443 is selected, and in a case in which the move is to the avatar of a specified user, an avatar button 446 is selected. When the location button 443 is selected, a location from a location list 445 is selected and the move is executed by pressing an execute button 450. In addition, it is also possible to search for a location in the location list 445 by a search field 444. A location on the location list 445 may be a location previously registered by a user when the user locates the avatar at that location or may be a location registered for all users or a specific group as a representative location in the virtual space. When the avatar button 446 is selected, a user is selected from a user list 448 and the move is executed by pressing the execute button 450. A user in the user list 448 may also be user-searched by using a search field 447. The user list 448 may include users registered through the above-described contacts application 404, or may be a publicly available list for all users or a specific group. In addition, status information 449 is displayed as information indicating the current status of each user in the user list 448. Pressing a back button 442 returns to the access screen 421, which is the screen before transitioning to the move screen 441.

Figure 5B:
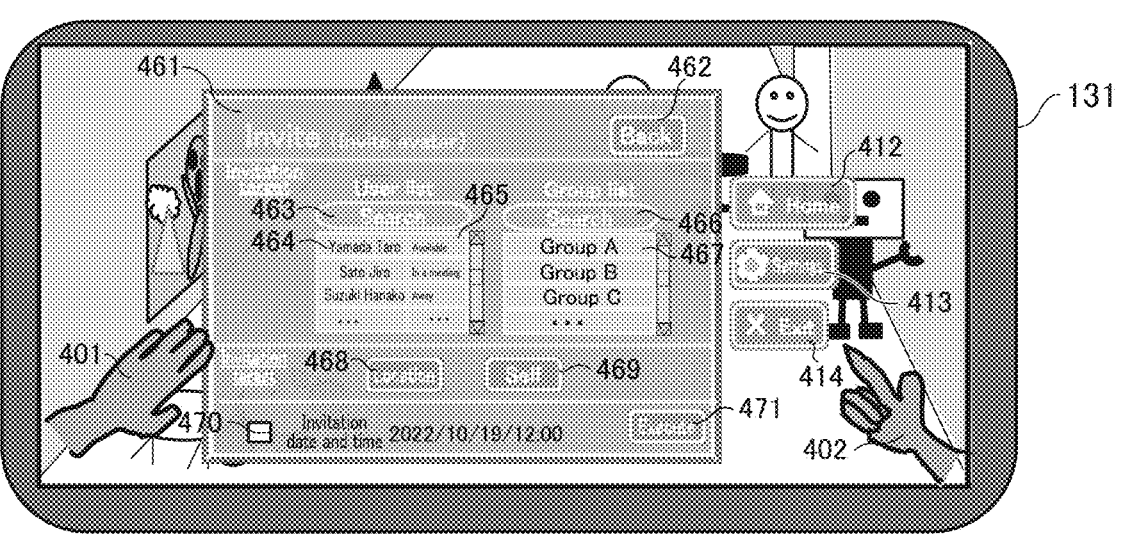

FIG. 5B is an invitation screen 461 that is transitioned to by pressing the invite application 428 on the access screen 421. The invitation screen 461 is for inviting an avatar of another users, and in a case of inviting to a specified location, a location button 468 is selected, and in a case of inviting to a location at which the self-avatar is present, a self-button 469 is selected. When the location button 468 is selected, a popup screen (not shown) is displayed on the invitation screen 461, and a location selection is made by displaying the search field 444 and the location list 445 on the popup screen. The invitation target can be a user or a user group. In a case of inviting the avatar of a specified user, the user is selected from a user list 464. At this time, a user search can be performed from the user list 464 by using a search field 463. Status information 465 indicates status information similar to status information 449. In addition, in a case of inviting the avatars of a specified user group, the group is selected from a group list 467. A group may be searched from the group list 467 via a search field 466. Selection of a user from the user list 464 and selection of a group from the group list 467 are not exclusive, and a selection may be made from both. Moreover, when selecting the location button 468 at the time of this invitation, not only are the avatars of users or user groups selected from the user list 464 and the group list 467 invited to the destination location, but the self-avatar is also invited and moves to that location. An invitation date and time 470 is such that an invitation is forcibly performed at the specified datetime and becomes effective by checking a checkbox. For example, when a teacher and students are in a school or plaza within a virtual space, it is assumed that students who are scattered and moving around separately as avatars in the virtual space during a break or free time are summoned to the teacher. In this case, students are automatically and forcibly summoned to the teacher at a lesson time or the next event start time, and the like. Thereby, a student may be summoned to the teacher at a specified time, even in a case in which the student has forgotten the lesson time or event start time, or has become lost within the virtual space. After performing the necessary settings for the above-described invitation, an invitation can be made by pressing the execute button 471. Pressing a back button 462 returns to the access screen 421, which is the screen before transitioning to the invitation screen 461.

Figure 6:
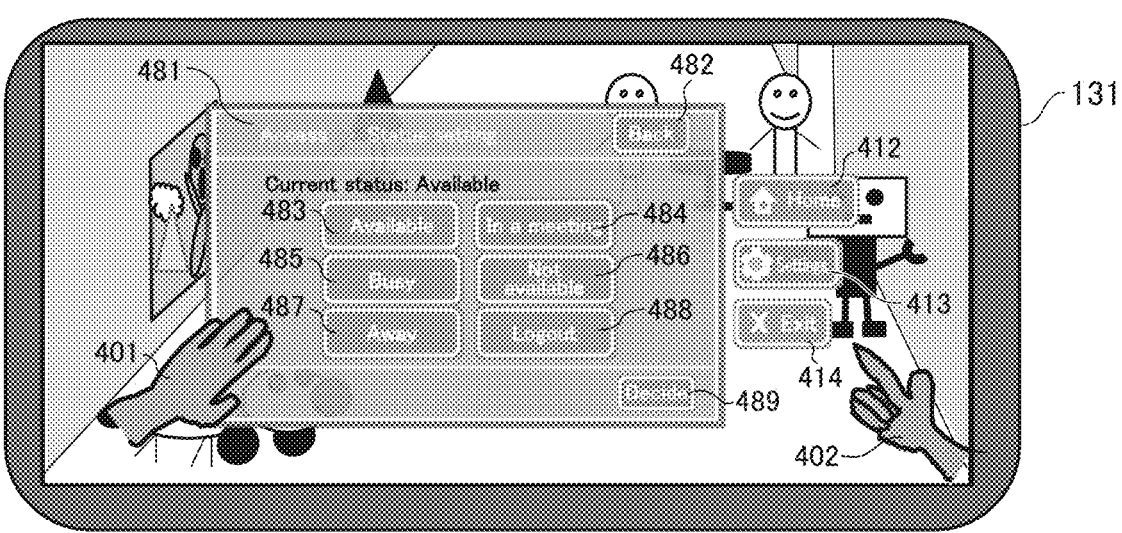
FIG. 6 is a display image diagram on the client terminal when selecting the movement or invitation of an avatar as a method of accessing another user on the client terminal in the First Embodiment.

FIG. 6 is a status setting screen 481 that is transitioned to by pressing the status setting button 429 on the access screen 421. This is for a user to set their current status to inform other users of the same, wherein the user themselves sets their current status. As examples of selectable statuses, there are available 483, in a meeting 484, busy 485, not available 486, away 487, logged out 488, and the like, and after selecting any thereof, the user presses a decision button 489 and sets the status. In addition, the status set here is intentionally set by the user and is one example of setting the current status. As another setting method, for example, the client terminal 131 may automatically set the status to available 483 by default after the user logs in, and after the user logs out, the status display automatically becomes logged out 488. Otherwise, the user may be automatically set as in a meeting 484 if the user is in a meeting, and as away 487 if no operation is performed for a predetermined time. Pressing a back button 482 returns to the access screen 421 before transitioning to the status setting screen 481.

Figure 7A:
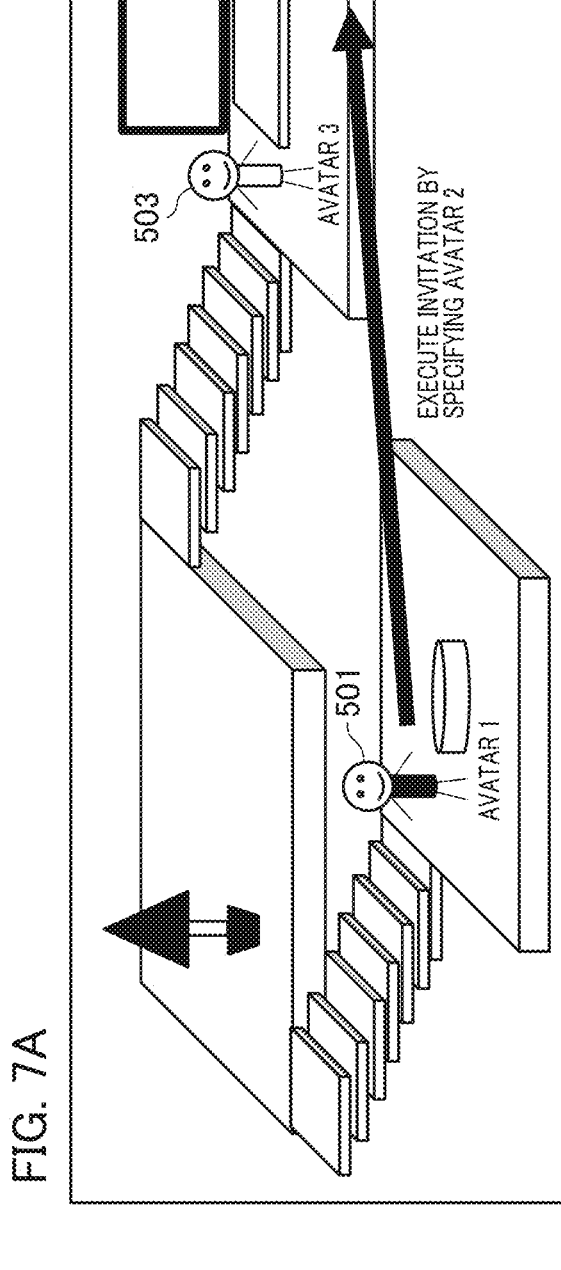
FIGS. 7A and 7B are image diagrams within the virtual space on the client terminal when executing the movement of an avatar as a method of accessing another user in the First Embodiment.
Figure 7B:
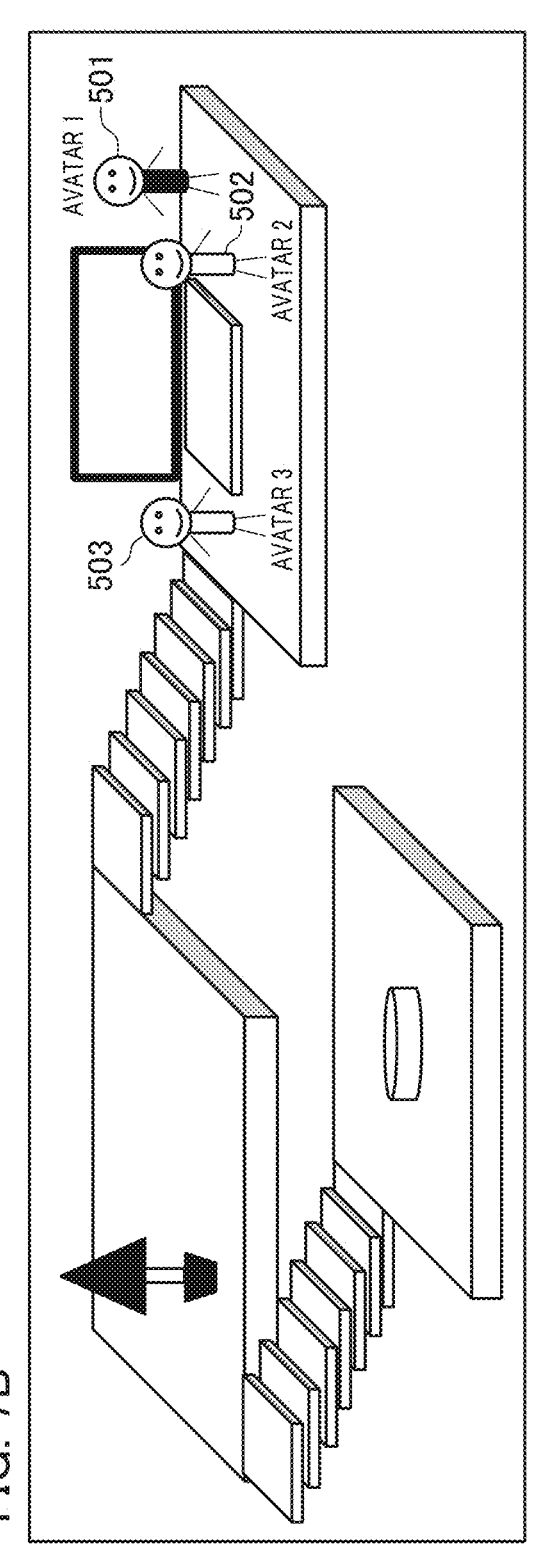

FIGS. 7A and 7B are image diagrams within the virtual space on the client terminal when executing the move of an avatar as a method of accessing another user in the First Embodiment. Specifically, in FIGS. 7A and 7B, when a user of the client terminal 131 executes the move by selecting the avatar button 446 on the move screen 441, the self-avatar of the user moves to the avatar of another user.

FIG. 7A shows Avatar 1 (501), Avatar 2 (502), and Avatar 3 (503) logged in within the virtual space, wherein "Avatar 1 (501)" and "Avatar 2 (502)" are at a distance from each other. In this state, the user of Avatar 1 (501) selects the avatar button 446 on the move screen 441 and then selects the user of Avatar 2 (502) from the user list 448 before pressing the execute button 450. This results in the state of FIG. 7B. In FIG. 7B, Avatar 1 (501) has instantly moved to the location of Avatar 2 (502).

Figure 8A:
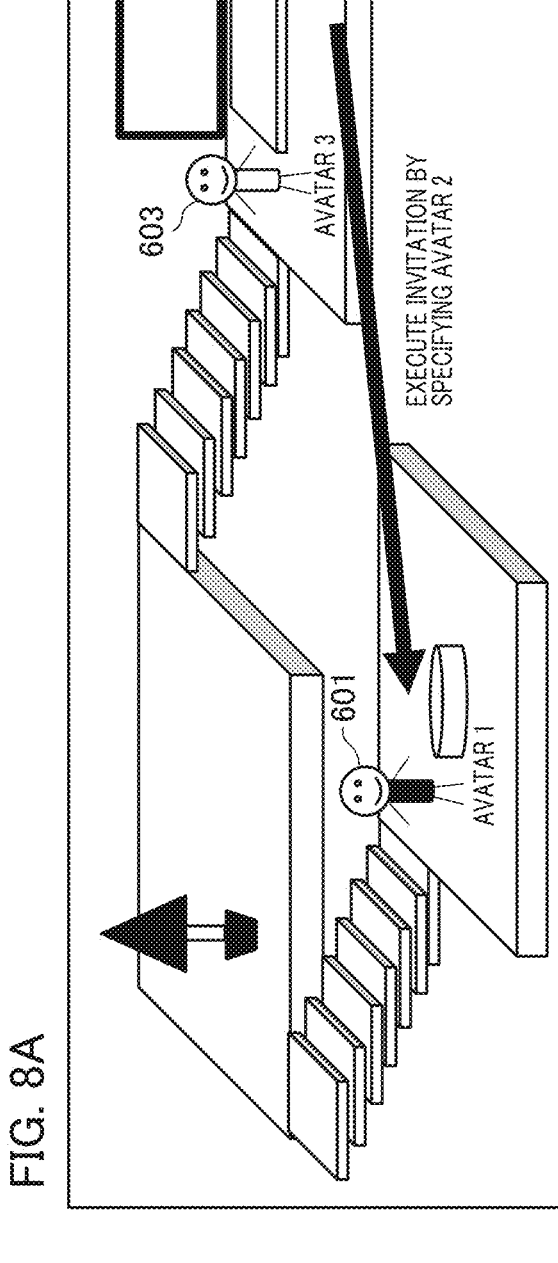
FIGS. 8A and 8B are image diagrams within the virtual space on the client terminal when executing the invitation of an avatar as a method of accessing another user in the First Embodiment.
Figure 8B:
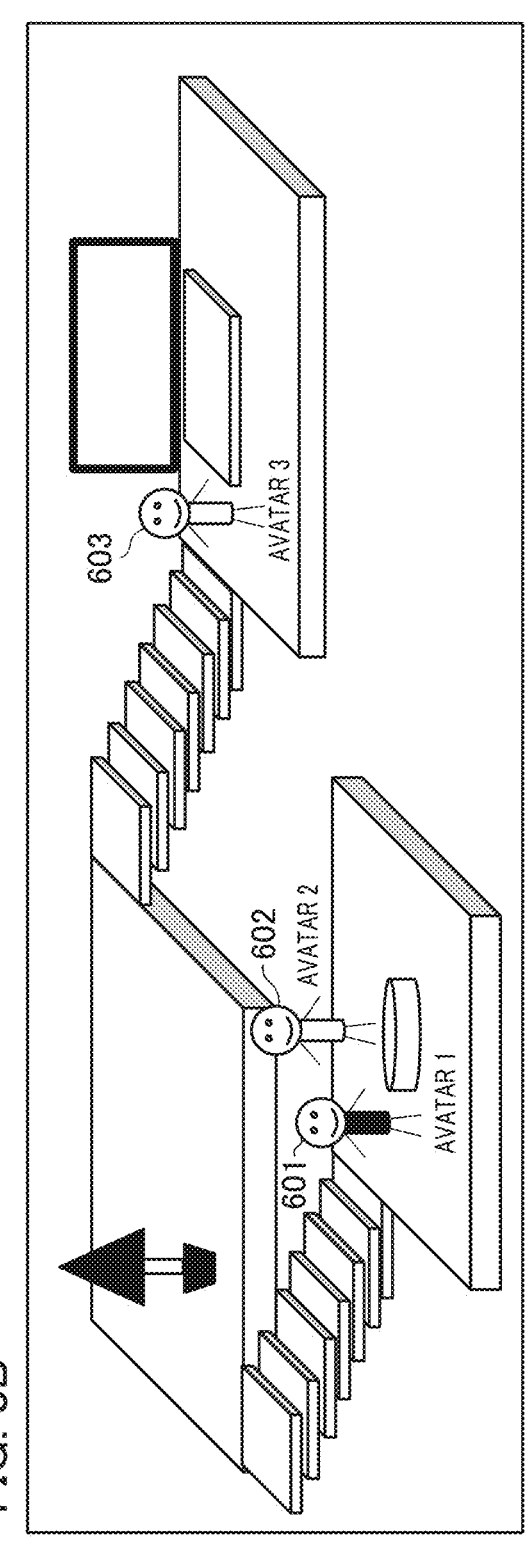

FIGS. 8A and 8B are image diagrams within the virtual space on the client terminal when executing the invitation of an avatar as a method of accessing another user in the First Embodiment. Specifically, in FIGS. 8A and 8B, when a user of the client terminal 131 executes an invitation by selecting the self button 469 on the invitation screen 461, the avatar of another user comes to the self-avatar of the user.

FIG. 8A is a similar state as that of FIG. 7A, wherein Avatar 1 (601), Avatar 2 (602), and Avatar 3 (603) are logged in within the virtual space, and wherein "Avatar 1 (601)" and "Avatar 2 (602)" are at a distance from each other. In this state, when the user of Avatar 1 (601) selects the self button 469 on the invitation screen 461, and then selects the user of Avatar 2 (602) from the user list 464, followed by pressing the execute button 471, the state becomes as shown in FIG. 8B. In FIG. 8B, Avatar 2 (602) has instantly come to the location of Avatar 1 (601).

Figure 9A:
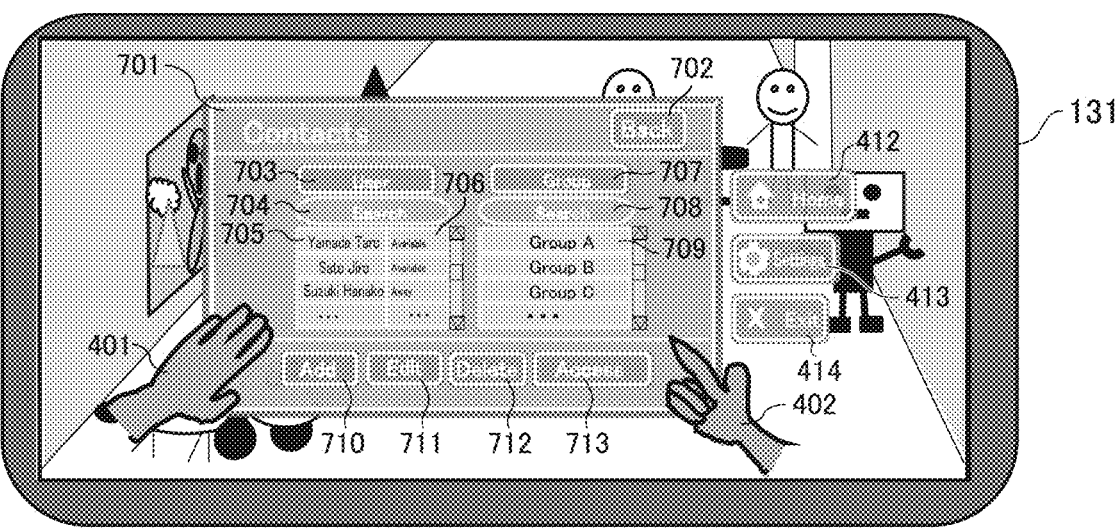
FIGS. 9A and 9B are display image diagrams on the client terminal when selecting the movement or invitation of an avatar as a method of accessing another user after selecting a destination on the client terminal in the First Embodiment.
Figure 9B:
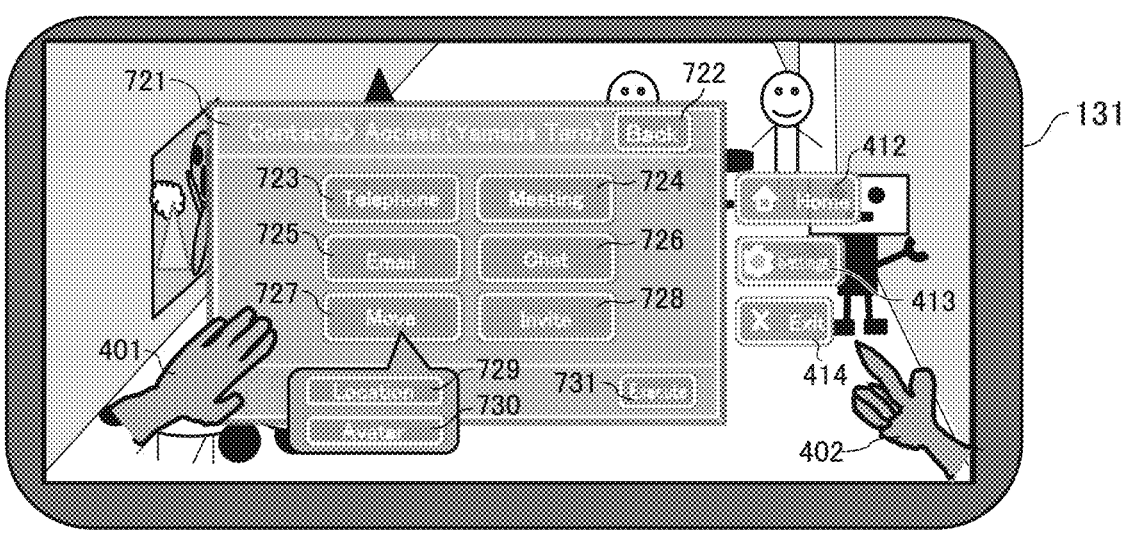
Figure 10:
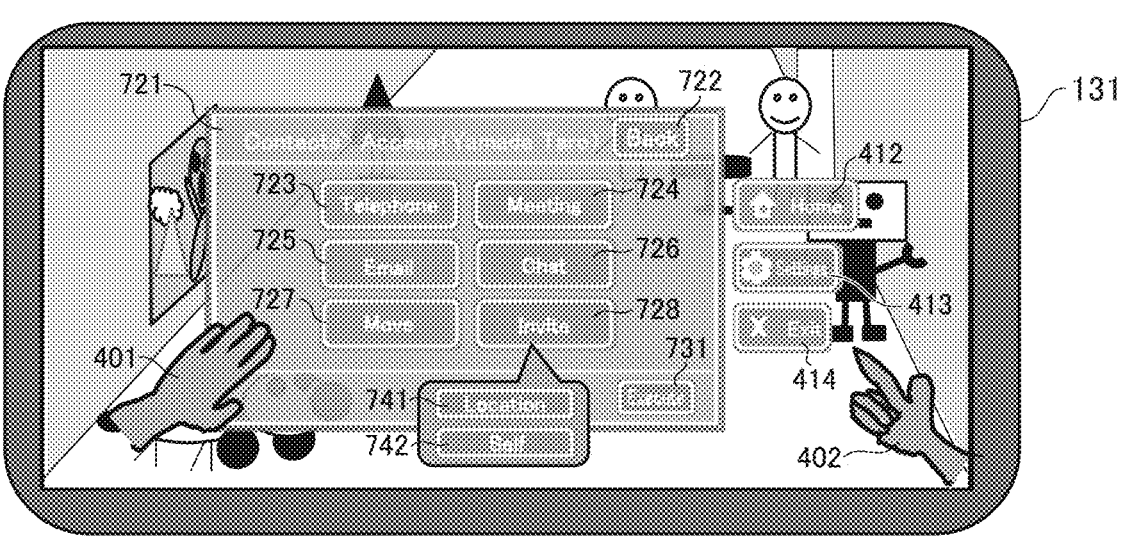
FIG. 10 is a display image diagram on the client terminal when selecting the movement or invitation of an avatar as a method of accessing another user after selecting a destination on the client terminal in the First Embodiment.

FIG. 9A to FIG. 10 are display image diagrams on the client terminal when selecting the movement or invitation of an avatar as a method of accessing another user after selecting a destination on the client terminal in the First Embodiment.

Specifically, FIG. 9A to FIG. 10 are screen transition images when a user selects the contacts application 404 on the home screen 403 of the client terminal 131 and then selects the movement or invitation of an avatar.

FIG. 9A is a contacts screen 701 that is transitioned to after selection of the contacts application 404 on the home screen 403 of FIG. 4A. After selecting a user button 703, an add button 710 is pressed, and a new user is added to a user list 705. Then, when an edit button 711 is pressed after the user has been selected in the user list 705, it is possible to change the contact information of the user, and when a delete button 712 is pressed, the user is removed from the user list 705. After selecting a user in the user list 705 and pressing an access button 713, it is possible to access the user. A search field 704 is equivalent to the search field 447 and a status information 706 is equivalent to the status information 449. After selecting a group button 707, when the add button 710 is pressed, a new group is added to a group list 709. When the add button 710 is pressed, a popup screen (not shown) is displayed on the contacts screen 701, displaying a list equivalent to the user list 705, and it is possible to select a plurality of users that belong to the same group. When the group button 707 is selected, and the edit button 711 is pressed after a group is selected from the group list 709, it is possible to change the group name and the users belonging to the group. In addition, when the delete button 712 is pressed, the group is deleted from the group list 709. Then, when the access button 713 is pressed after group selection in the group list 709, it is possible to access the group.

FIG. 9B is a contact access screen 721 that is transitioned to when the user button 703 is selected in the contacts screen 701 and a user is selected from the user list 705 (for example: Yamada Taro). In the contact access screen 721, various applications for accessing the selected user can be selected. Applications 723 to 728 each correspond to the applications 423 to 428 of the above-described FIG. 4B. On the contact access screen 721, when a move application 727 is selected, options are displayed for a location button 729 to move to a specified location and an avatar button 730 to move to an avatar of another user by specifying the user. The user can select either of these options, and upon pressing execute 731, can move the self-avatar. In this manner, the plurality of options displayed on the access screen 421 of the present embodiment includes at least a movement that specifies a predetermined event, a movement that specifies a predetermined location, and a movement that specifies the avatar of another user.

FIG. 10 is a screen example when an invitation application 728 is selected in the contact access screen 721. When the invitation app 728 is selected, options are displayed for a location button 741 to invite the avatar of another user to a specified location and for a self button 742 to invite the avatar of another user to the location of the self-avatar. The user can invite the avatar of another user by selecting either of these options and pressing execute 731. At this time, when the location button 741 is selected, the self-avatar also moves to the specified location.

Here, in the case of either the location button 729 at the time of moving or the location button 741 at the time of inviting, pressing either of these buttons displays a popup screen (not shown) on the contact access screen. Then, by displaying information equivalent to the search field 444 and the location list 445 on the popup screen, location specification is possible.

Figure 11A:
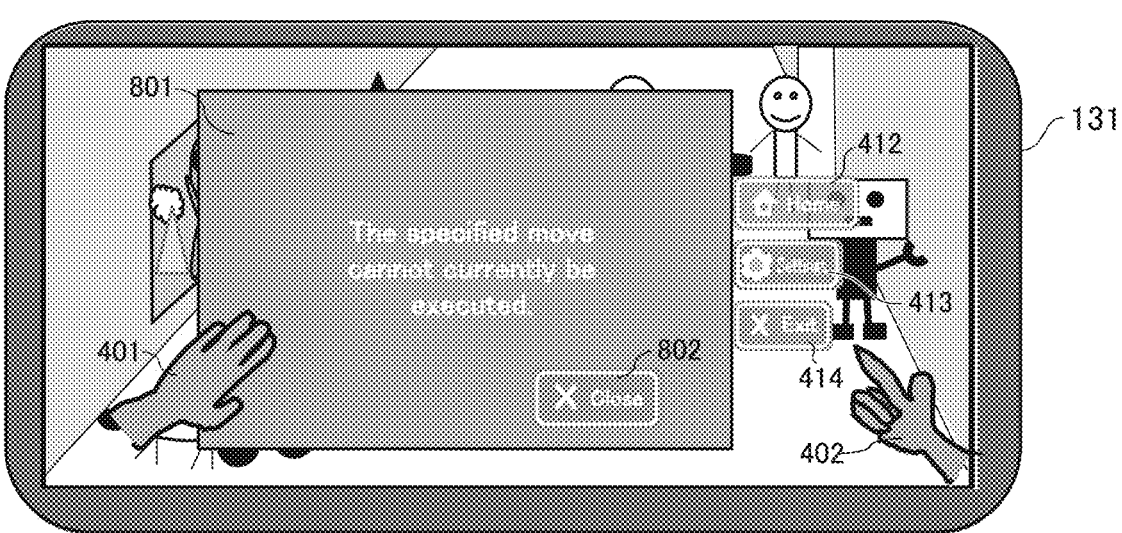
FIGS. 11A and 11B are display image diagrams on the client terminal showing a case in which, after executing the movement or invitation of an avatar as a method of accessing another user on the client terminal, the movement or invitation is denied by the other user in the First Embodiment.
Figure 11B:
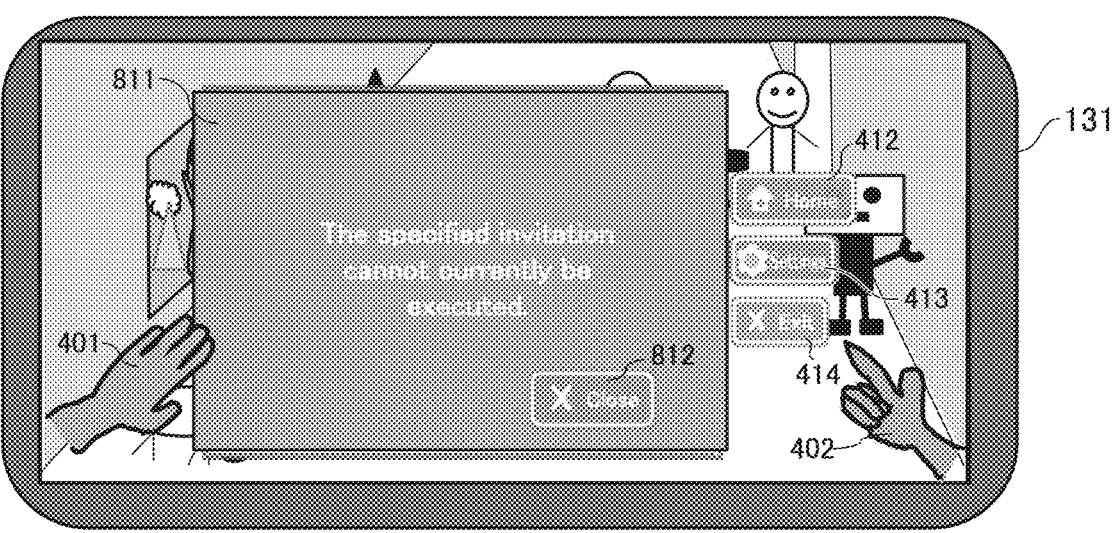

In any of the move screen 441, the invitation screen 461, or the contact access screen 721, when a movement request or an invitation request is made, the client terminal 131 inquires to the specified client terminal 131 of another user about the possibility or impossibility of the move or invitation. In a case in which the client terminal 131 of another user cannot permit the requested move or invitation based on the status of the other user (see FIG. 6) and settings, a message indicating that the execution of the move or invitation is not possible is displayed on the client terminal 131 of the user who made the request (refer to FIGS. 11A and 11B). FIGS. 11A and 11B are display image diagrams on the client terminal showing a case in which, after executing the movement or invitation of an avatar as a method of accessing another user on the client terminal, the movement or invitation is denied by the other user in the First Embodiment Here, the possibility or impossibility of the move or invitation, at the time of a movement or an invitation request, may be confirmed by the client terminal 131 of another user through a confirmation screen (not shown) via the display unit 321 to the other user.

FIG. 11A is a screen example in a case in which a move cannot be executed, wherein a message indicating that the move cannot be executed is displayed on the move not possible screen 801. When a close button 802 is pressed, the screen can be closed. FIG. 11B is a screen example in a case in which an invitation cannot be executed, wherein a message indicating that the invitation cannot be executed is displayed on the invitation not possible screen 811. When a close button 812 is pressed, the screen can be closed.

The series of processes for sharing virtual objects in the virtual space and moving or inviting avatars in the present embodiment will be explained with reference to FIG. 12 to FIG. 18.

Figure 12:
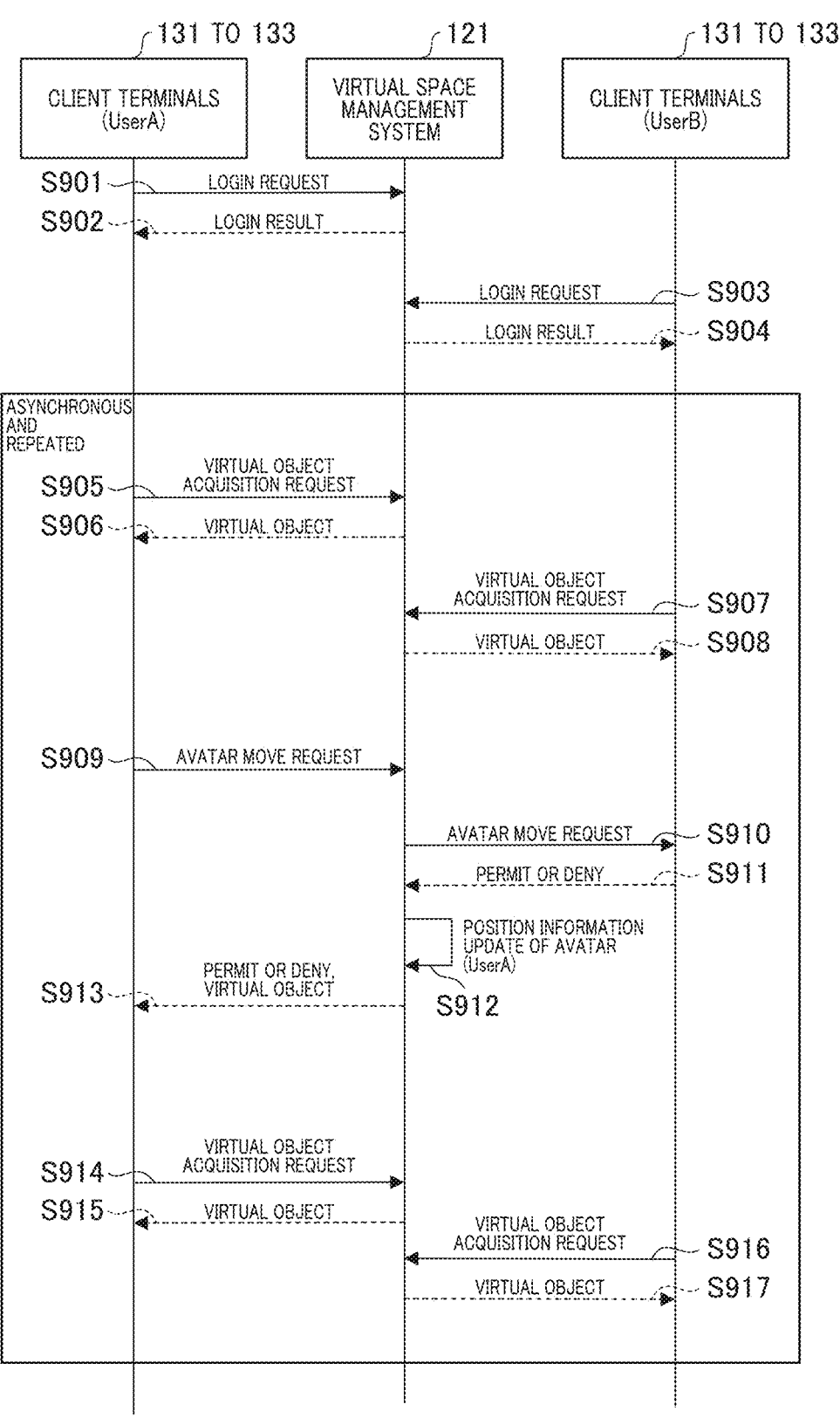
FIG. 12 is a diagram representing a processing sequence when sharing a virtual object on the client terminal and moving an avatar in the virtual space management system in the First Embodiment.

FIG. 12 is a diagram representing a processing sequence when sharing a virtual object on the client terminal and moving an avatar in the virtual space management system in the First Embodiment. Hereinafter, each process is carried out according to each step prefixed with "S". Each process in the following flowchart is executed by the CPU 202 of client terminals 131 to 133, or the CPU 202 of the virtual space management system 121, reading out and executing a program stored in a storage medium.

At step S901, the login unit 322 of client terminals 131 to 133 of User A transmits the user ID and password to the login processing unit 312. At step S902, the login processing unit 312 refers to the user information management table (Table 1) that is managed by the user management unit 311. A confirmation is made that the user ID and password match for User A, and if the user ID and password match, the login result is returned as successful. Similarly, at step S903, the login unit 322 of client terminals 131 to 133 of User B transmits the user ID and password to the login processing unit 312. At step S904, the login processing unit 312 refers to the user information management table (Table 1) that is managed by the user management unit 311. A confirmation is made that the user ID and password match for User B, and if the user ID and password match, the login result is returned as successful.

Thereafter, in steps S905 to S917, steps related to the acquisition and updating of virtual objects are executed. The processing of steps S905 to S917 are executed asynchronously and periodically with the other steps.

At step S905, the local virtual object management unit 323 of client terminals 131 to 133 sends a virtual object acquisition request to the virtual object management unit 313. At step S906, a virtual object is acquired. The virtual object acquired at step S906 is a virtual object in the virtual object management table (Table 2) managed by the local virtual object management unit 323. Similarly, at step S907, the local virtual object management unit 323 of client terminals 131 to 133 sends a virtual object acquisition request to the virtual object management unit 313. At step S908, a virtual object is acquired.

At step S909, User A sends a movement request for the self-avatar from client terminals 131 to 133. Here, the local virtual object management unit 323 transmits the movement request that includes the specified user for the move destination (for example: User B) in the request information. Then, when the virtual object management unit 313 of the virtual space management system 121 receives the movement request, the virtual object management unit 313 confirms the specified user (for example: User B) for the move destination included in the request.

At step S910, the movement request is further transmitted to client terminals 131 to 133 of User B. Client terminals 131 to 133 of User B receive the movement request by the local virtual object management unit 323 and present a selection screen (not shown) via the display unit 321 that enables selection of whether or not to permit the movement request.

When permit or deny is selected on the selection screen of step S910, at step S911, client terminals 131 to 133 of User B respond with the selection result from the local virtual object management unit 323 to the virtual object management unit 313 of the virtual space management system 121. The virtual object management unit 313 that has received a response, in a case in which the response is "permit", acquires the position information of the avatar of User B. In the present embodiment, the position information of the avatar of User B is the main coordinates of the virtual object with the virtual object ID "userB" in Table 3.

At step S912, based on the information acquired at step S911, the position information of the avatar (virtual object) of User A is updated and included in the response. At this time, in step S912, the virtual object management unit 313 updates the position information of the avatar of User A to a location as close as possible to the avatar of User B, and at a point at which no other virtual objects exist.

At step S913, the virtual object management unit 313 responds with information of permission or denial to the local virtual object management unit 323 of client terminals 131 to 133 of User A. When permission is granted, the response includes a virtual object representing the avatar of the above-described User A. The client terminals 131 to 133 of User A that receive the response update based on the response information in the local virtual object management unit 323. Here, in a case in which "permit" is the response, the position information of the self-avatar is updated. In addition, in a case in which "deny" has been responded, a message indicating that the move is not possible is displayed via the display unit 321 (FIG. 11A).

Steps S914 to S915 perform operations similar to those of steps S905 to S908. In the present embodiment, it is assumed that User A and User B log in through client terminals 131 to 133 by steps S901 to S904, and then periodically make virtual object acquisition requests at steps S905 to S908, and at steps S914 to S917. As another example, a virtual object acquisition request may be made randomly.

Here, the specific processing contents of "steps S909 to S913" are explained by using the flowcharts in each of FIG.

Figure 13:
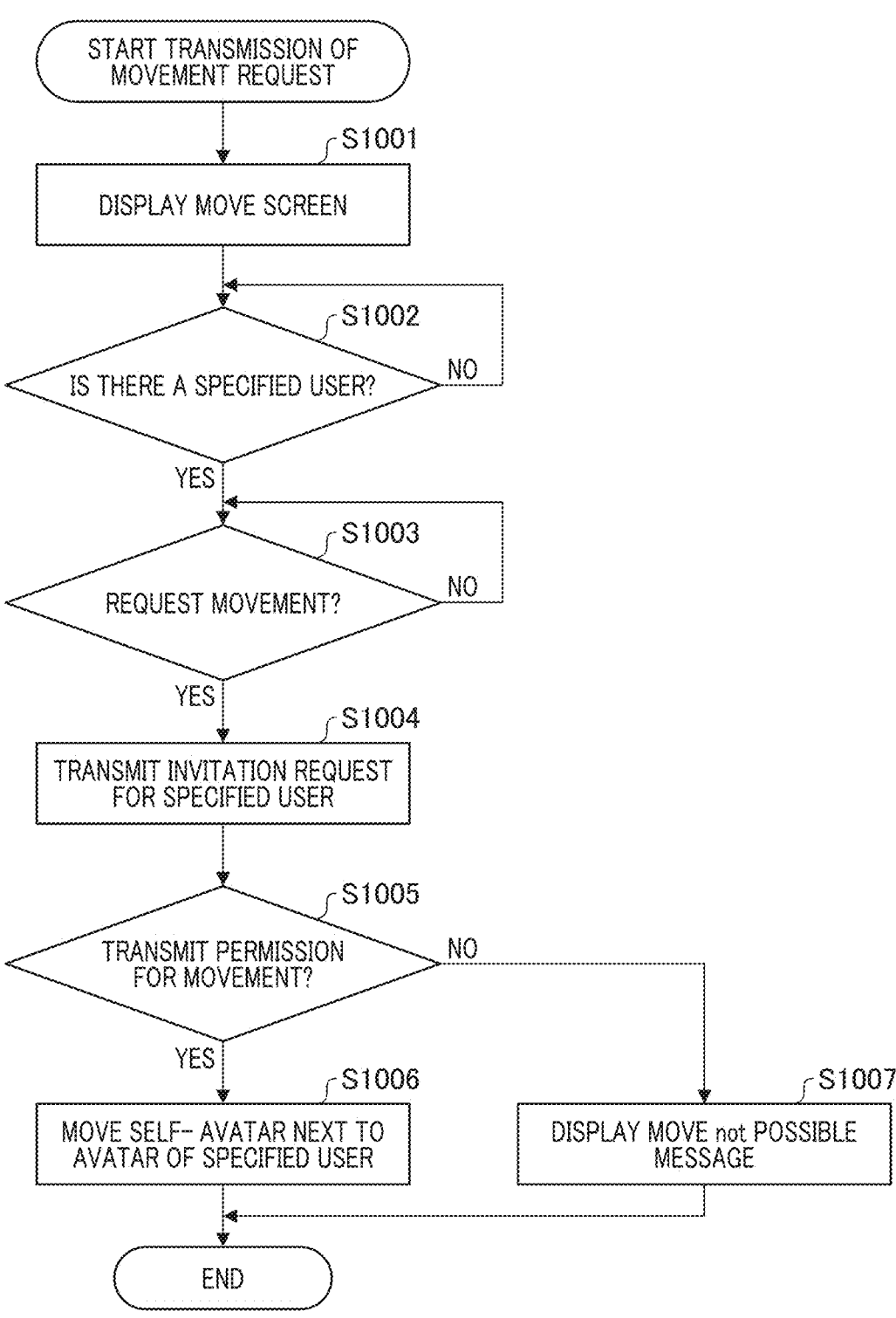
FIG. 13 is a processing flowchart for when a movement request of an avatar is made from a client terminal to the virtual space management system in the First Embodiment.
Figure 14:
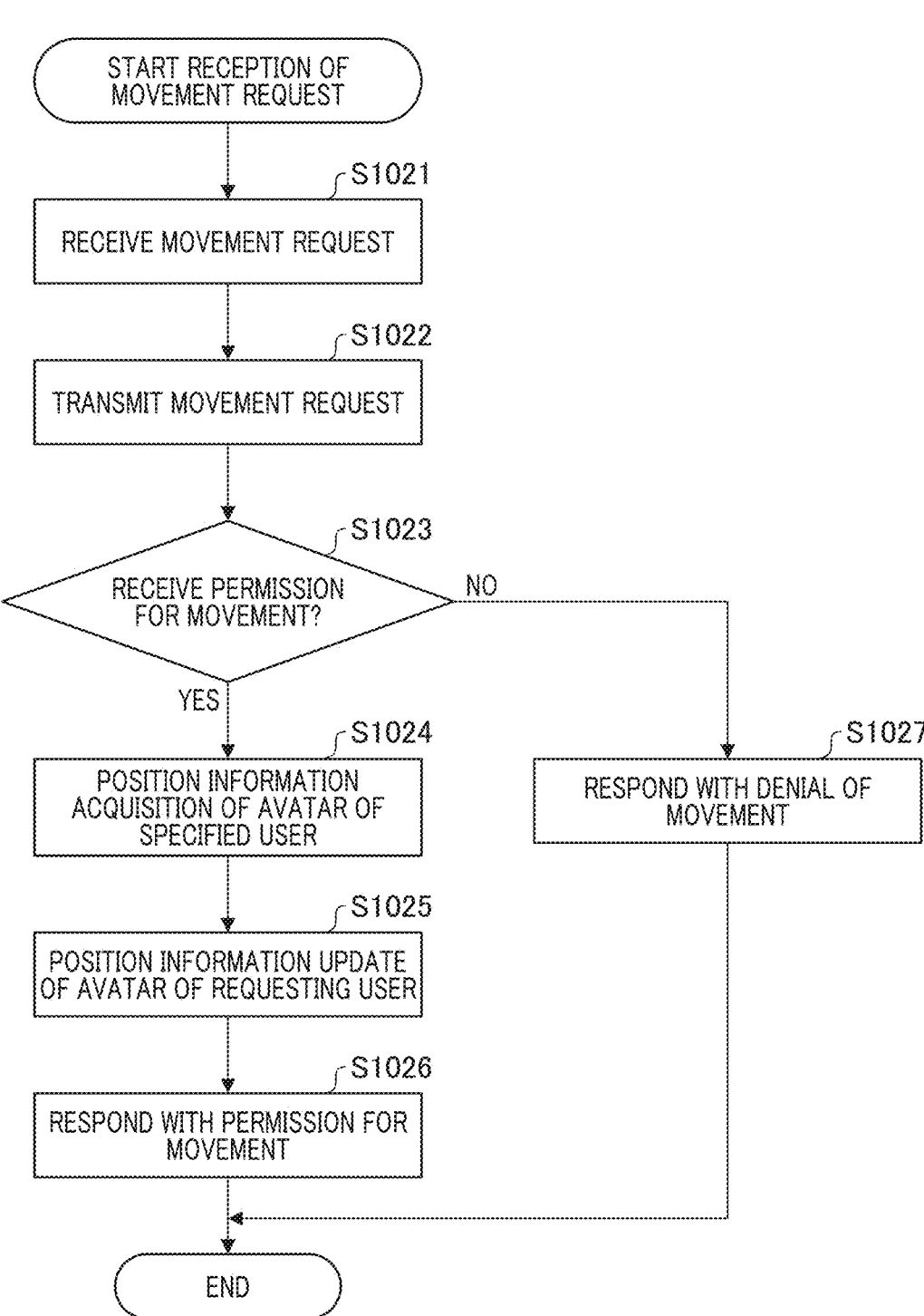
FIG. 14 is a processing flowchart for when a movement request of an avatar is made from a client terminal to the virtual space management system in the First Embodiment.
Figure 15:
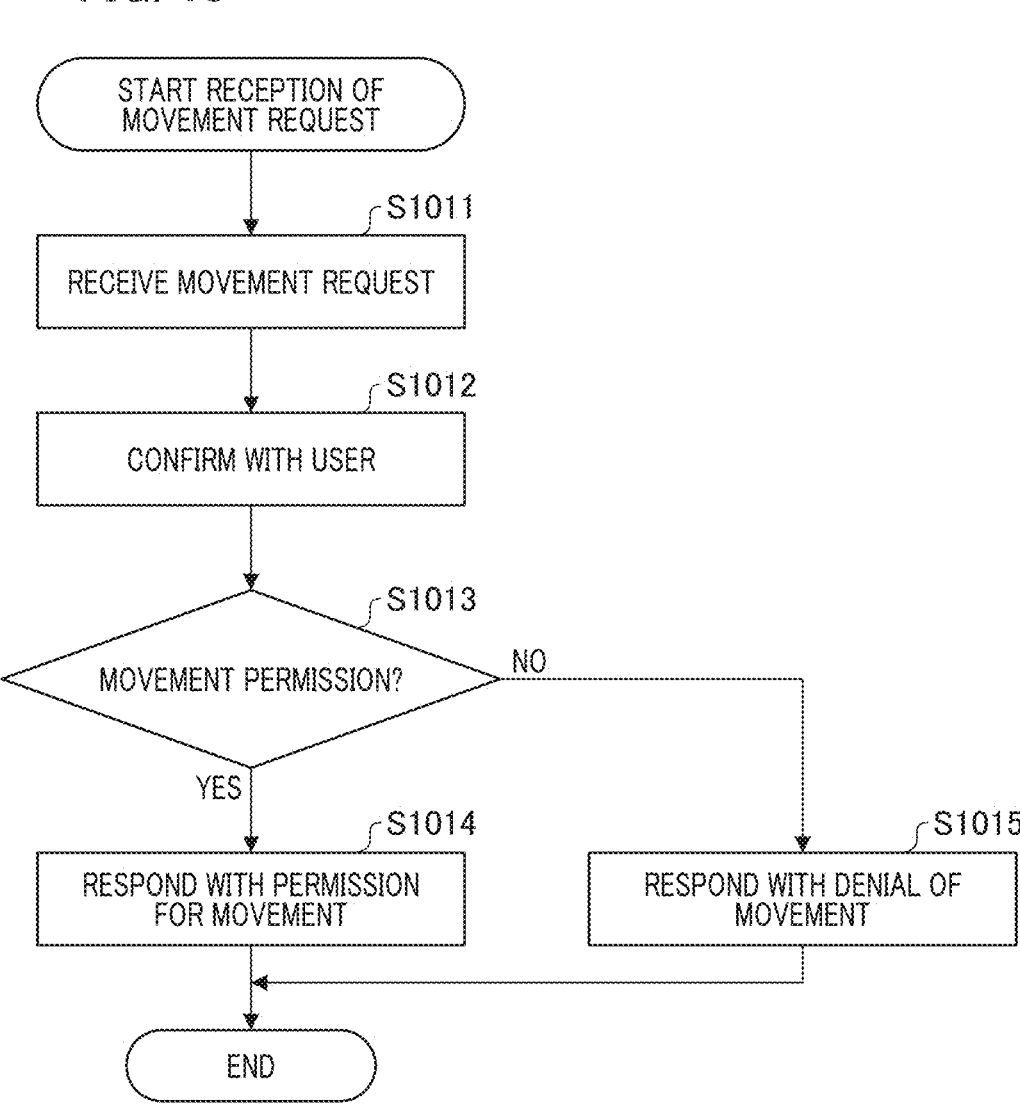
FIG. 15 is a processing flowchart for when a movement request of an avatar is made from a client terminal to the virtual space management system in the First Embodiment.

13, FIG. 14, and FIG. 15. FIG. 13 through FIG. 15 are processing flowcharts for when a movement request of an avatar is made from a client terminal to the virtual space management system in the First Embodiment.

FIG. 13 is the processing of client terminals 131 to 133 of User A in steps S909 to S913. At step S1001, the local virtual object management unit 323 displays the move screen 441 based on an instruction of the user received via the display unit 321. Here, the CPU 202 of the present embodiment functions as a providing unit that provides a plurality of options for the movement of the user avatar in the virtual space. At step S1002, confirmation is made as to whether there is a user designation. When a user is selected from the user list 448 and the execute button 450 is pressed, a move execution is requested in step S1003. At step S1004, an invitation request for the specified user is transmitted to the virtual space management system 121. At step S1005, it is confirmed as to whether or not "permit" (and the virtual object of the avatar of User A) is received as a response to the movement request from the virtual space management system 121. In a case in which permission for the move is received, at step S1006, the self-avatar is moved next to the avatar of the specified user. Here, the CPU 202 of the present embodiment functions as a moving unit that moves avatar of the user to another location in the virtual space according to a selection from a plurality of options. In contrast, in a case in which "deny" is received as a response to the movement request at step S1005, a message indicating that the move is not possible is displayed at step S1007. In this manner, in the example shown in FIG. 13, permission is obtained from the user of the other user avatar (the specified user) with respect to a request to move to the location of the other user avatar (the avatar of the specified user). In a case in which permission is obtained, the user avatar is moved to the location of the other user avatar.

FIG. 14 is the processing of the virtual space management system 121 in steps S909 to S913. At step S1021, the virtual object management unit 313 receives a movement request for an avatar from client terminals 131 to 133 of User A. Upon receiving the movement request, the virtual object management unit 313 confirms the specified user (example: User B) for the move destination included in the request. At step S1022, the virtual object management unit 313 further transmits the movement request to the client terminals 131 to 133 of User B. At step S1023, whether "permit" is received as a response from the client terminals 131 to 133 of User B is confirmed. In a case in which "permit" is received, at step S1024, the position information of the avatar of User B is acquired. At step S1025, based on the acquired position information, the position information of the avatar (virtual object) of User A is updated. At step S1026, the virtual object management unit 313 responds to the local virtual object management unit 323 of client terminals 131 to 133 of User A with the information of "permit". Here, the virtual object management unit 313 responds with the virtual object representing the avatar of User A together with the information of "permit". In contrast, in a case in which "deny" is received as a response at step S1023, the virtual object management unit 313 at step S1027 responds with the information of "deny" to the local virtual object management unit 323 of client terminals 131 to 133 of User A.

FIG. 15 is the processing of client terminals 131 to 133 of User B in steps S909 to S913. At step S1011, the local virtual object management unit 323 receives a movement request for an avatar received from the virtual space management system 121. At step S1012, the local virtual object management unit 323 presents the user with a confirmation screen via the display unit 321 that asks whether or not to permit the movement request. At step S1013, it is confirmed as to whether or not the user permits the move, and if the move is permitted, at step S1014, "permit" is responded to the virtual space management system 121. In contrast, in a case in which the move is not permitted, the local virtual object management unit 323 at step S1015 responds with "deny" to the virtual space management system 121.

Figure 16:
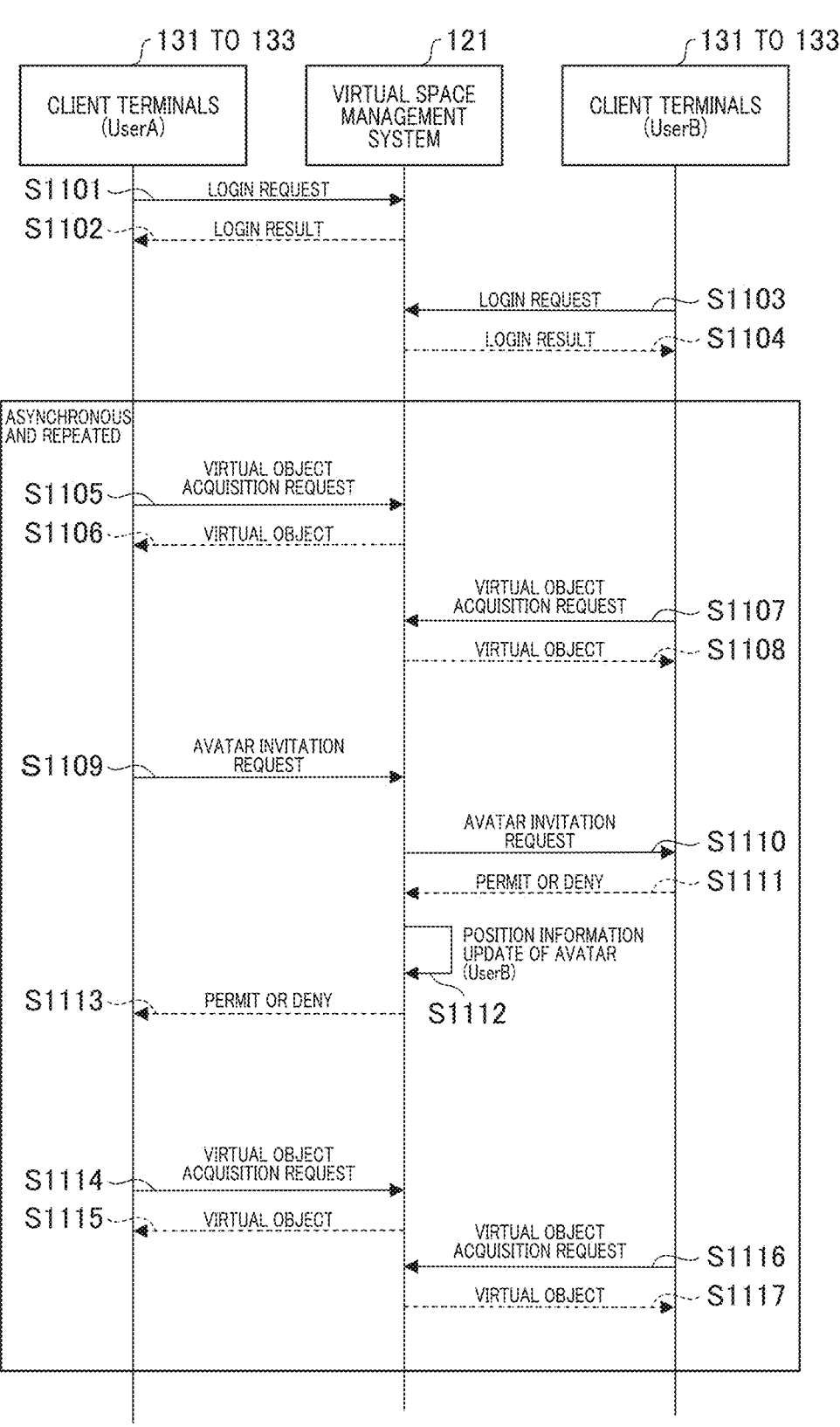
FIG. 16 is a diagram representing the processing sequence for when sharing a virtual object on the client terminal and inviting an avatar in the virtual space management system in the First Embodiment.

FIG. 16 is a diagram that represents the processing sequence in the virtual space management system in the First Embodiment when sharing virtual objects and inviting avatars in a client terminal. Steps S1101 to S1104 are respectively similar to steps S901 to S904 of FIG. 12. Thereafter, in steps S1105 to S1117, steps related to the acquisition and updating of virtual objects are executed, and are executed asynchronously and periodically with other steps. Steps S1105 to S1108 and S1114 to S1117 are, respectively, similar to steps S905 to S908 and S914 to S917 of FIG. 12.

At step S1109, User A sends an invitation request to the avatar of User B from client terminals 131 to 133. Here, the local virtual object management unit 323 sends the invitation request that includes the specified user that is the invitation target (example: User B) and the invitation destination (example: self) in the request information.

The virtual object management unit 313 of the virtual space management system 121 receives the invitation request. At step S1110, the virtual object management unit 313 confirms the specified user that is the invitation target (example: User B) included in the request and further transmits the invitation request to the client terminals 131 to 133 of User B.

Client terminals 131 to 133 of User B receive the invitation request through the local virtual object management unit 323 and present a selection screen (not shown) via the display unit 321 that enables the user to select whether or not to permit or deny the invitation request. Permit or deny is selected on this selection screen. At step S1111, client terminals 131 to 133 of User B respond with the selection result from the local virtual object management unit 323 to the virtual object management unit 313 of the virtual space management system 121.

In a case in which "permit" has been responded, the virtual object management unit 313 that has received the response acquires the position information of the avatar of User A. In the present embodiment, the position information of the avatar of User A is the main coordinates of the virtual object, which is the virtual object ID "User A" in Table 3. At step S1112, based on the acquired information, the position information of the avatar (virtual object) of User B is updated. At this time, the virtual object management unit 313 updates the position information of the avatar of User B to a location as close as possible to the avatar of User A and at a location at which no other virtual objects exist.

At step S1113, a response of permit or deny is made to the local virtual object management unit 323 of client terminals 131 to 133 of User A. Based on the response information in the local virtual object management unit 323, client terminals 131 to 133 of User A end the processing of the invitation request as is in a case in which "permit" is responded. In addition, in a case in which "deny" is responded, a message indicating that the invitation is not possible is displayed via the display unit 321 (FIG. 11B).

In the present embodiment, it is assumed that User A and User B log in through client terminals 131 to 133 by steps S1101 to S1104, and then periodically make virtual object acquisition requests at steps S1105 to S1108, and at steps S1114 to S1117. As another example, a virtual object acquisition request may be made randomly.

Figure 17:
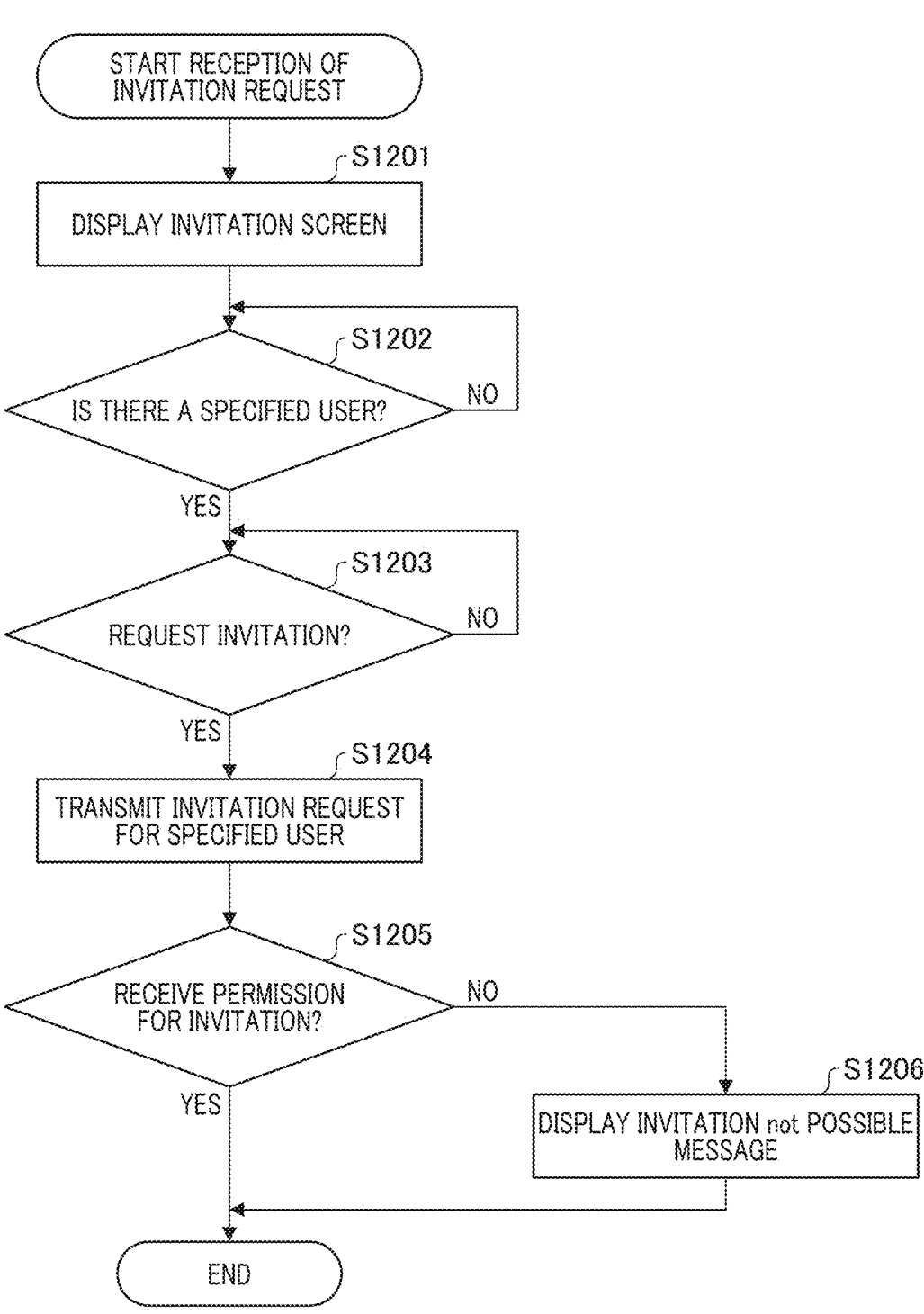
FIG. 17 is a processing flowchart for when an invitation request of an avatar is made from a client terminal to the virtual space management system in the First Embodiment.
Figure 18:
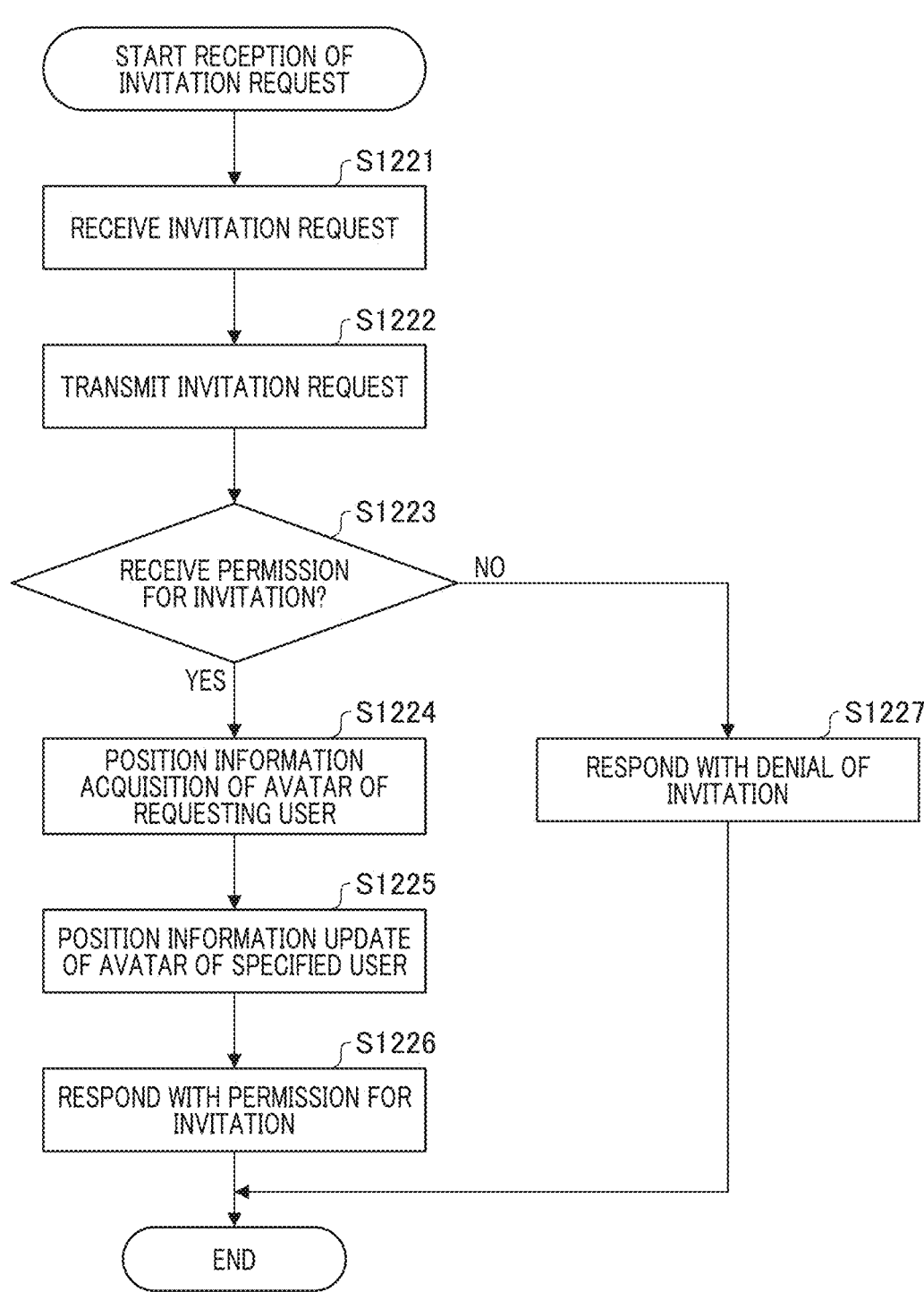
FIG. 18 is a processing flowchart for when an invitation request of an avatar is made from a client terminal to the virtual space management system in the First Embodiment.
Figure 19:
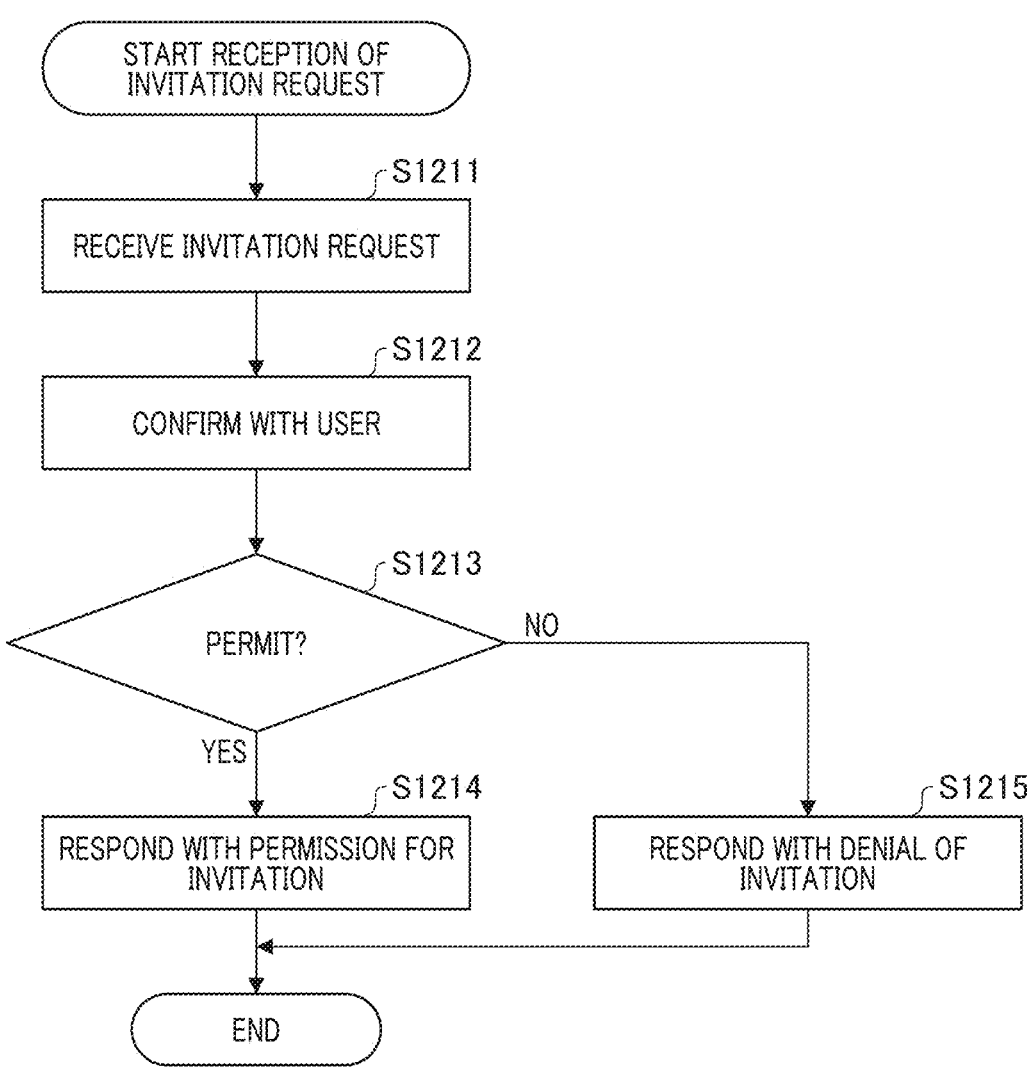
FIG. 19 is a processing flowchart for when an invitation request of an avatar is made from a client terminal to the virtual space management system in the First Embodiment.

Here, the specific processing contents of "steps S1109 to S1113" are explained by using the flowcharts in each of FIG. 17, FIG. 18, and FIG. 19. FIG. 17 through FIG. 19 are processing flowcharts for when an invitation request of an avatar is made from a client terminal to the virtual space management system in the First Embodiment.

FIG. 17 is the processing of client terminals 131 to 133 of User A in steps S1109 to S1113. At step S1201, the local virtual object management unit 323 displays the invitation screen 461 based on user instructions received via the display unit 321. At step S1202, it is confirmed as to whether there is a user designation from the user list 464. At step S1203, it is confirmed as to whether the execute button 471 has been pressed and an invitation execution has been requested. In a case in which an invitation has been requested, at step S1204, an invitation request for the specified user is transmitted to the virtual space management system 121. At step S1205, it is confirmed as to whether or not "permit" is received as a response to the invitation request from the virtual space management system 121. In a case in which permission for the invitation is received, the process is terminated as is. In contrast, in a case in which "deny" is received at step S1205, a message indicating that the invitation is not possible is displayed at step S1206.

FIG. 18 is the processing of the virtual space management system 121 in steps S1109 to S1113. At step S1221, the virtual object management unit 313 receives an invitation request for an avatar from client terminals 131 to 133 of User A. Upon receiving the invitation request, the virtual object management unit 313 confirms the specified user (example: User B) that is the invitation target included in the request. At step S1222, the virtual object management unit 313 further transmits the invitation request to the client terminals 131 to 133 of User B. At step S1223, whether "permit" is received as a response from the client terminals 131 to 133 of User B is confirmed. In a case in which "permit" is received, the position information of the avatar of User A, who is the requester of the invitation request, is acquired in step S1224. At step S1225, based on the acquired position information, the position information of the avatar (virtual object) of User B is updated. At step S1226, the virtual object management unit 313 responds to the local virtual object management unit 323 of client terminals 131 to 133 of User A with the information of "permit". In contrast, in a case in which "deny" is received at step S1223, at step S1227, the virtual object management unit 313 responds with the information of "deny" to the local virtual object management unit 323 of client terminals 131 to 133 of User A. In this manner, in the example shown in FIG. 18, permission is obtained from the user (specified user) of another user avatar with respect to an invitation request to the location of the avatar of the other avatar (avatar of the specified user). In a case in which permission is obtained from the specified user, the avatar of the other user is moved to the location of the user avatar.

FIG. 19 is the processing of client terminals 131 to 133 of User B in steps S1109 to S1113. At step S1211, the local virtual object management unit 323 receives an invitation request for an avatar received from the virtual space management system 121. At step S1212, a confirmation screen is presented via the display unit 321 that asks the user whether or not to permit or deny the invitation request. At step S1213, it is confirmed whether or not the user permits the invitation. In a case in which the invitation is permitted, at step S1214, "permit" is responded to the virtual space management system 121. In contrast, in a case in which the invitation is not permitted, at step S1215, the local virtual object management unit 323 responds with "deny" to the virtual space management system 121.

In this manner, in the First Embodiment, a method has been explained whereby a certain user, when accessing another user, can select a means specific to a virtual space to move or invite an avatar based on a user designation. Thereby, in addition to conventional methods such as calls, meetings, email, and chat, access corresponding to a variety of use cases becomes possible.

It should be noted that in the present embodiment, each time there is a movement request or invitation request from the user avatar (first user avatar) side, a response of permission/denial from the other user avatar (second user avatar) side is obtained individually. However, this is not limited thereto. For example, even if there is a movement request, in the case of a predetermined situation, it may be possible to comprehensively set in advance that the first user avatar is not moved to the location of the second user avatar. Furthermore, even if there is an invitation request, in a predetermined situation, it may be possible to comprehensively set in advance that the second user avatar is not moved to the location of the first user avatar. Here, a "predetermined situation" refers to a situation in which the movement of a user avatar is restricted.

As a predetermined situation, the location of one user avatar may be a location to which another user avatar does not have entry authorization. A location without entry authorization includes, for example, a location within a paid area or a location within an area that is restricted to specific entrants for security reasons. However, in any case, there is no need to restrict the movement of the first user avatar or to restrict the invitation of the second user avatar. For example, even in a paid area, in a case in which the user that made the movement request or the user that granted the invitation request has paid a fee, then the corresponding user avatar may be permitted entry to a location within the paid area. In addition, in a case in which a ticket is held to an area where security is imposed, the user avatar of the user holding the ticket may be permitted to enter the area. Furthermore, in a case in which entry to an area requires a fee or a ticket, it may be possible to confirm with each user about the payment of the fee or the purchase of the ticket.

In addition, as a predetermined situation, the user of the second user avatar may set in advance to deny any user avatar from moving to the location of the second user avatar. Furthermore, rather than all user avatars, it may be possible for the user of the second user avatar to create in advance a list that denies specific user avatars from moving to the location of the second user avatar. This list is referred to as a "blacklist". In a case in which the first user avatar is included in the blacklist, then a movement request (or invitation request) from the first user avatar is denied. It should be noted that merely being included in the blacklist does not necessitate denying a movement request (or an invitation request) in any given case. The move of the first user avatar may be denied only in a case in which the blacklist includes the first user avatar, and the user of the second user avatar allows restrictions on movement requests (or invitation requests) based on the blacklist.

In addition, a list that serves as the basis for a restriction of a movement does not necessarily have to be a blacklist. For example, as a predetermined situation, the user of the second user avatar may create in advance a list that permits movement to the location of the second user avatar. This list is referred to as a "whitelist". In a case in which the first user avatar is not included in the whitelist, then a movement request (or invitation request) from the first user avatar is denied. It should be noted that merely not being included in the whitelist does not necessitate denying a movement request (or an invitation request) in any given case. The move of the first user avatar may be denied only in a case in which the whitelist does not include the first user avatar, and the user of the second user avatar allows restrictions on movement requests (or invitation requests) based on the whitelist.

In addition, a predetermined situation may be a situation in which the second user avatar is participating in an event in which the first user avatar is set not to participate. For example, assume that the user of the first user avatar has set that during a predetermined event (for example, a conversation event), the first user avatar will not move to the location of the second user avatar. In this case, in a case in which the second user avatar is in the middle of a conversation event with another user avatar, the first user avatar will not move, even without a permit or deny response from the second user avatar.

In addition, a predetermined situation may be a situation in which the second user avatar is participating in an event, wherein the user of the second user avatar has set to deny the movement of any user avatar during the event activation. For example, assume that the user of the second user avatar has set that during a conversation event, a movement to the location of the second user avatar by any user avatars is denied. In this case, in a case in which the second user avatar is in the middle of a conversation event, the first user avatar will not move, even without a permit or deny response from the second user avatar.

Second Embodiment

The First Embodiment explained that, at the time of access to another user through the movement or invitation of avatars, the "self-avatar" and "avatar of another user" move to a distance at which they come into contact with each other. In contrast, conventional virtual spaces have a contact event function, in which an event is activated when avatars come into contact (close proximity) with each other. Activation events include, for example, initiating a conversation when the avatars are in contact with each other, exchanging contacts, and the like. At the time of movement or invitation, a case in which this contact event is desired to be activated and a case in which it is desired not to be activated differ depending on the time. For example, in a case of accessing a user for the first time, activating a contact exchange event at the time of a movement is desired, but in a case in which the same user is accessed a second time, activation of a contact exchange event is neither necessary nor desired. In the present embodiment, it is possible to control, based on the decision of the user, whether movement or invitation occurs with the contact event being "activated" or "not activated". Using FIG. 20A to FIG. 25, parts in the present embodiment that differ from the First Embodiment will be explained.

FIG. 20A to FIG. 21B are display image diagrams on the client terminal for setting a contact event when an avatar of another user is contacted in the Second Embodiment. Specifically, they are screens of a case in which a contact event is set when the "avatar of the user" contacts the "avatar of another user" in the virtual space of the Second Embodiment. In these screens, screen operations on the display 206 of the HMD-type client terminal 131 are depicted.

Figure 20A:
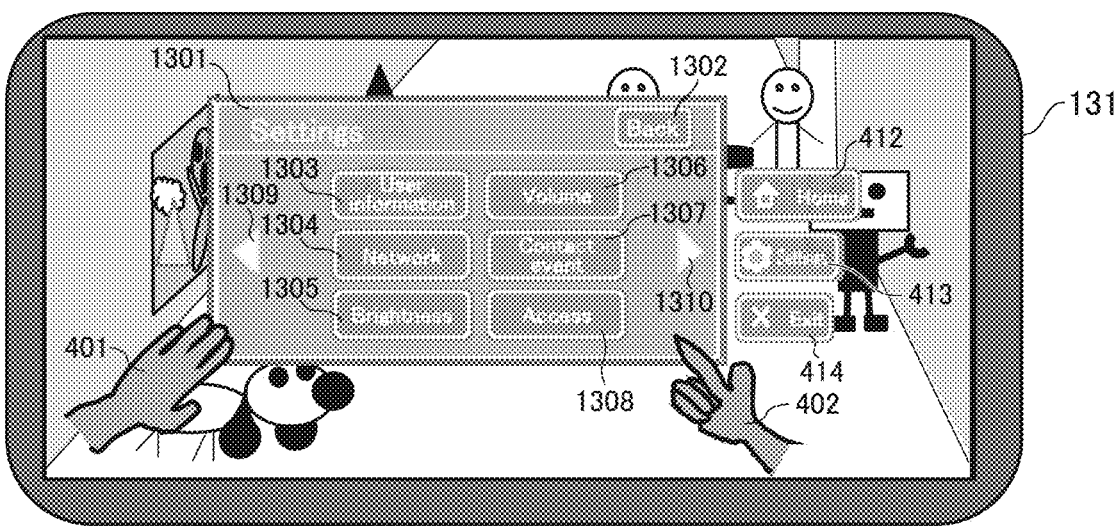
FIGS. 20A and 20B are display image diagrams on the client terminal for setting a contact event when an avatar of another user is contacted in a Second Embodiment.

FIG. 20A is a settings screen 1301 that is transitioned to by pressing the settings button 413 on the home screen 403. In the settings screen 1301, buttons for transitioning to various settings screens such as settings related to each application and network settings are displayed. In FIG. 20A, transition buttons to settings such as access settings 1308, user information settings 1303, network settings 1304, screen brightness settings 1305, volume settings 1306, and contact event settings 1307 are displayed. By a left transition button 1309 and a right transition button 1310, the screen area displaying transition buttons (1303 to 1308) to each settings screen within the settings screen 1301 can be moved left or right so as to display other settings (not shown). A back button 1302 is for returning to the screen before transitioning to the settings screen 1301 (that is, the home screen 403).

Figure 20B:
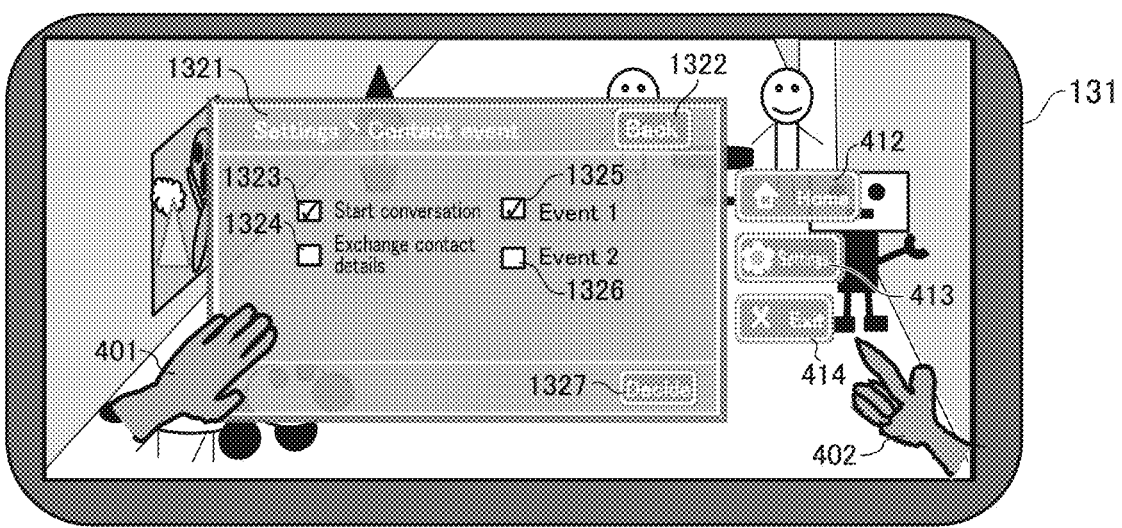

FIG. 20B is a contact event settings screen 1321 that is transitioned to by pressing contact event settings 1307 in the settings screen 1301. In the contact event settings screen 1321, which event to activate when the "user avatar" contacts the "avatar of another user" is set. For example, in a case in which an event to initiate a conversation is activated, a check is input in a checkbox 1323, and by pressing a decision button 1337, an event to initiate a conversation is activated. Similarly, there is a checkbox 1324 for events to exchange contact details, and checkboxes 1325 and 1326 for other events. At this time, it is assumed that a plurality of events can be set to be activated. A back button 1322 is a button for returning to the screen before transitioning to the settings screen 1321 (that is, the settings screen 1301).

Figure 21A:
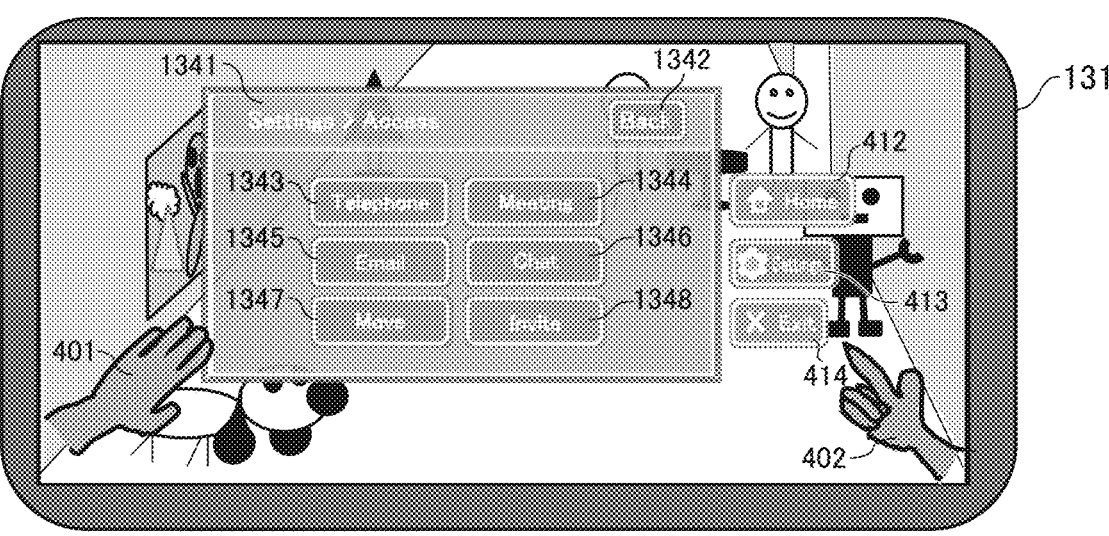
FIGS. 21A and 21B are display image diagrams on the client terminal for setting a contact event when an avatar of another user is contacted in the Second Embodiment.

FIG. 21A is an access settings screen 1341 that is transitioned to by pressing access settings 1308 in the settings screen 1301. In the access settings screen 1341, buttons for transitioning to various settings screens for each application used at the time of access are further displayed. In FIG. 21A, transition buttons to settings such as telephone settings 1343, meeting settings 1344, email settings 1345, chat settings 1346, movement settings 1347, and invitation settings 1378 are displayed. A back button 1342 is for returning to the screen before transitioning to the settings screen 1341 (that is, the settings screen 1301).

Figure 21B:
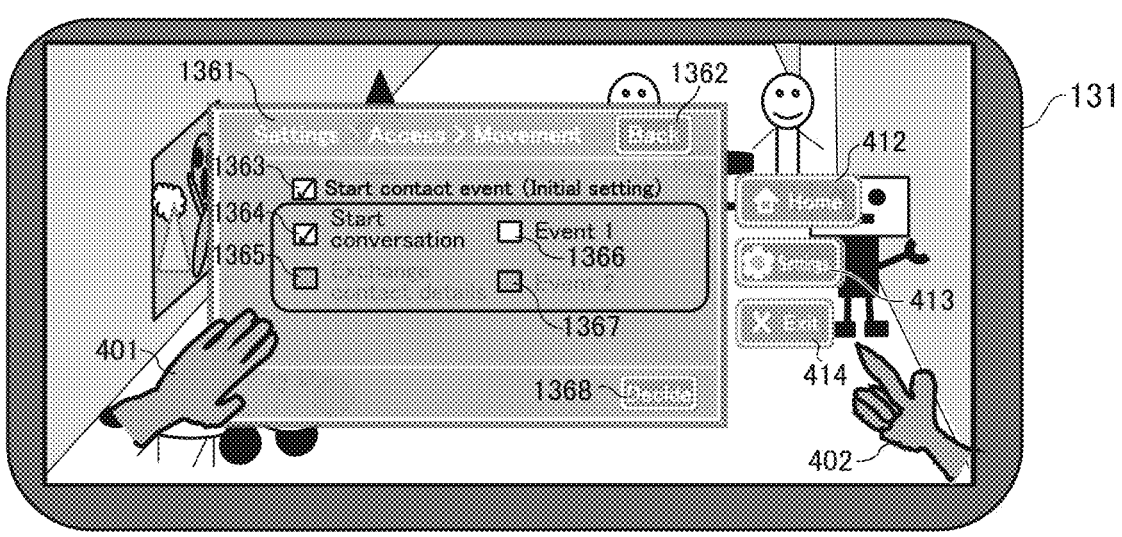

FIG. 21B is a movement settings screen 1361 that is transitioned to by pressing movement settings 1347 in the access settings screen 1341. In the movement settings screen 1361, initial settings are set so as to determine whether or not to activate a contact event when moving the self-avatar to the location of the avatar of another user. In a case of activating a contact event, a check is placed in a checkbox 1363. Then, the user selects which event to activate by checkboxes 1364 to 1367. Checkboxes 1364 to 1367 correspond, respectively, to 1323 to 1326 of FIG. 20B. Events that have not been checked in the contact event settings screen 1321 of FIG. 20B are grayed out and made uncheckable in the movement settings screen 1361. When the event to be activated at the time of the movement is selected in the movement settings screen 1361, the decision is made by pressing a decision button 1368. A back button 1362 is for returning to the screen before transitioning to the movement settings screen 1361 (that is, the access settings screen 1341). In the present embodiment, the CPU 202 functions as an event presentation unit that presents an event that is activated at the time at which the user avatar moves to a different location.

Figure 22:
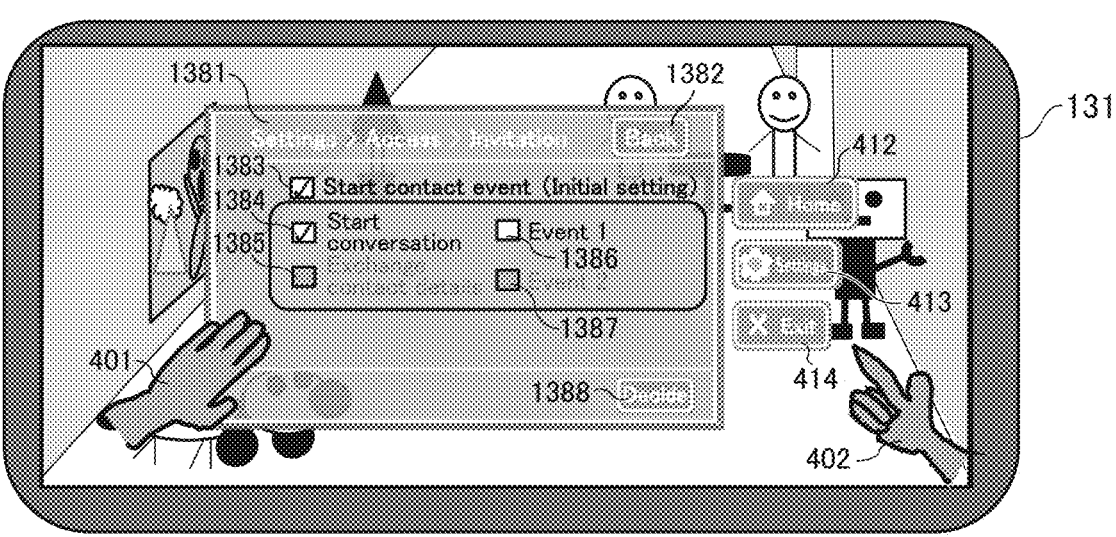
FIG. 22 is a display image diagram on the client terminal for setting a contact event when an avatar of another user is contacted in the Second Embodiment.

FIG. 22 is an invitation settings screen 1381 that is transitioned to by pressing invitation settings 1348 in the access settings screen 1341. In the invitation settings screen 1381, initial settings are set as to whether or not to activate a contact event when inviting the avatar of another user to the location of the self-avatar. In a case of activating a contact event, a check is placed in a checkbox 1383. Then, the user selects which event to activate by checkboxes 1384 to 1387. Checkboxes 1384 to 1387 correspond respectively to 1323 to 1326 of FIG. 20B. Events that have not been checked in the contact event settings screen 1321 of FIG. 20B are grayed out and made uncheckable in the invitation settings screen 1381. When the event to be activated at the time of the invitation is selected in the invitation settings screen 1381, the decision is made by pressing a decision button 1388. A back button 1382 is for returning to the screen before transitioning to the invitation settings screen 1381 (that is, the access settings screen 1341).

Figure 23A:
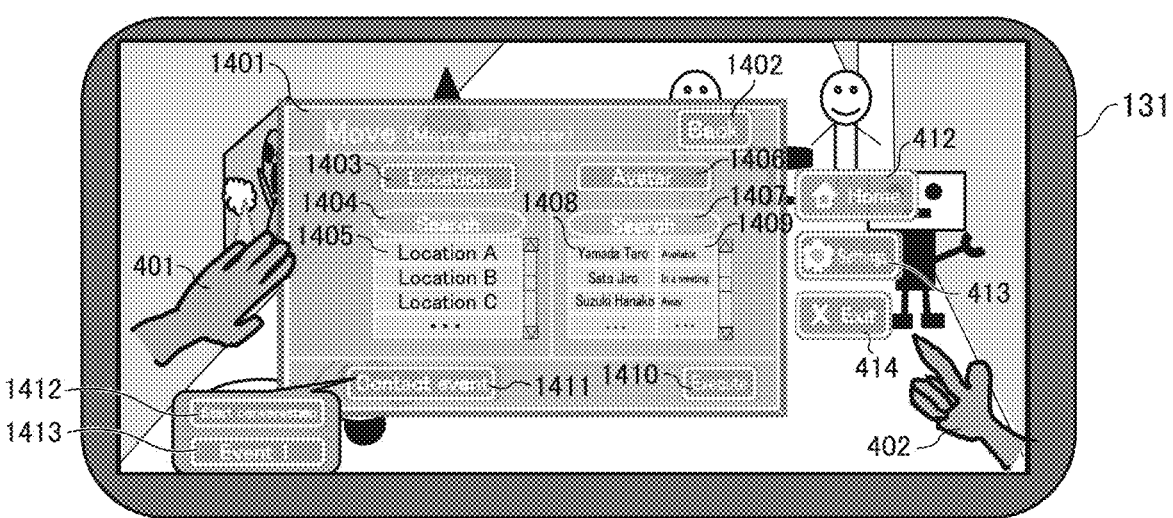
FIGS. 23A and 23B are display image diagrams on the client terminal for setting the enabling or disabling of a contact event when selecting the movement or invitation of an avatar as a method of accessing another user in the Second Embodiment.
Figure 23B:
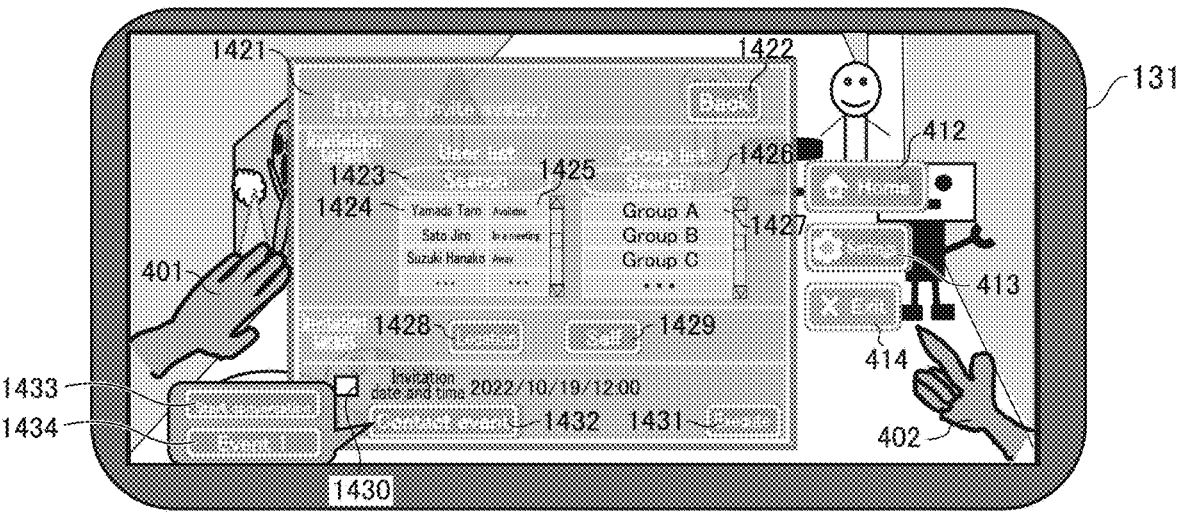

FIG. 23A and FIG. 23B are display image diagrams for setting the activation or deactivation of a contact event on a client terminal in the Second Embodiment when selecting a movement or an invitation of an avatar as a method of accessing another user on a client terminal.

FIG. 23A is a move screen 1401 that is transitioned to by pressing the move application 427 in the access screen 421 and is a screen that corresponds to the move screen 441 FIG. 5A in the First Embodiment. The buttons (or displays) 1402 to 1410 on the move screen 1401 each correspond to the buttons (or displays) 442 to 450 on the move screen 441. In the Second Embodiment, a difference from the move screen 441 is that there is a contact event button 1411 on the move screen 1401. The contact event button 1411 enables a selection of ON/OFF for selecting whether or not to activate an event at the time of movement. Each press of the contact event button 1411 toggles the ON/OFF. In addition, the initial setting of the ON/OFF of the contact event button 1411 is determined based on the setting of the checkbox 1363 of the movement settings screen 1361 explained in FIG. 21B. In a case in which the checkbox 1363 is checked, the initial setting of the contact event button 1411 is ON. In addition, activation events at that time will be the events checked in checkboxes 1364 to 1367 in the movement settings screen 1361. Pressing the contact event button 1411 to change from OFF to ON will display events 1412 to 1413 as options for which event to activate. This option displays only the events checked on the contact event setting screen 1321 of FIG. 20B as selections, and enables for a plurality of selections (turning the button for the selection "ON") from among the options.

FIG. 23B is an invitation screen 1421 that is transitioned to by pressing the invite application 428 in the access screen 421 and is a screen that corresponds to the invitation screen 461 in FIG. 5B of the First Embodiment. Buttons (or displays) 1422 to 1431 on the invitation screen 1421 each correspond to the buttons (or displays) 462 to 471 on the invitation screen 461. In the Second Embodiment, a difference from the invitation screen 461 is that there is a contact event button 1432 on the invitation screen 1421. The contact event button 1432 enables a selection of ON/OFF as to whether or not to activate an event at the time of invitation. Each press of the contact event button 1432 toggles the ON/OFF. In addition, the initial setting of the ON/OFF of the contact event button 1432 is determined based on the setting of the checkbox 1383 of the invitation settings screen 1381 explained in FIG. 22. In a case in which the checkbox 1383 is checked, the initial setting of the contact event button 1432 is ON. In addition, activation events at that time will be the events checked in checkboxes 1384 to 1387 in the invitation settings screen 1381. Pressing the contact event button 1432 to change from OFF to ON will display events 1433 to 1434 as options for which event to activate. This option displays only the events checked on the contact event setting screen 1321 of FIG. 20B as selections, and enables for a plurality of selections (turning the button for the choice "ON") from among the options.

Figure 24:
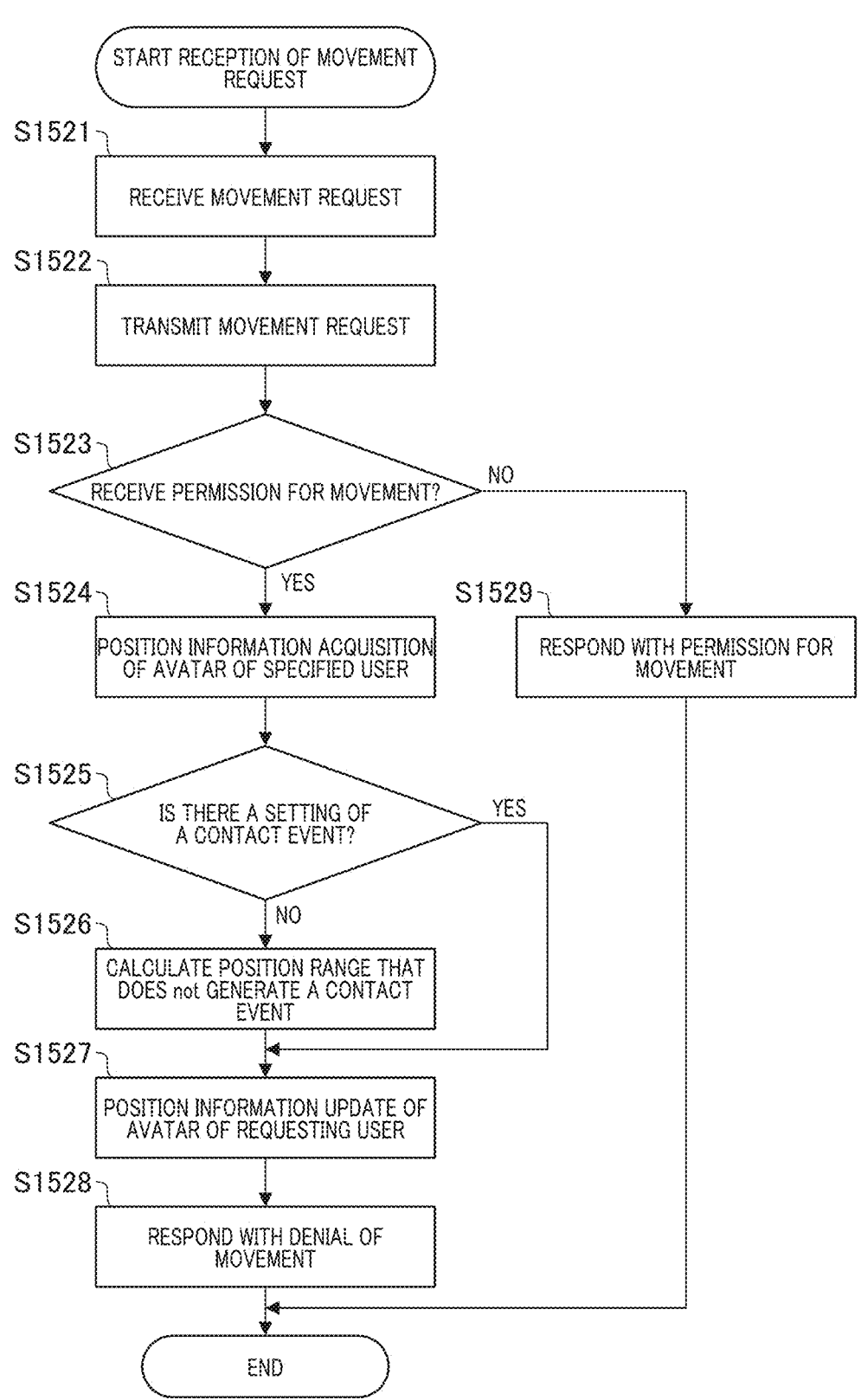
FIG. 24 is a processing flowchart for when a movement request of an avatar is made from a client terminal to the virtual space management system in the Second Embodiment.

FIG. 24 is a processing flowchart for when a movement request of an avatar is made from a client terminal to the virtual space management system in the Second Embodiment. Specifically, in the Second Embodiment, it is the processing flow when the virtual space management system 121 receives a movement request of an avatar from client terminals 131 to 133 of User A in FIG. 12. This corresponds to the processing of the virtual space management system 121 in steps S909 to S913 in FIG. 12. Steps S1521 to S1524 are processes equivalent to steps S1021 to S1024 in FIG. 14. At step S1524, position information of the avatar of the specified user (User B) is acquired. At step S1525, the virtual object management unit 313 checks as to whether or not there is a setting for a contact event in the movement request. In a case in which there is no setting for a contact event in step S1525, then at step S1526, a position range that does not generate a contact event for User B is calculated from the position information of the avatar of User B acquired at step S1524. At step S1527, based on the calculated position range in step S1526, position information of the avatar of User A is updated. At step S1528, "permit" for the movement and the avatar of User A (virtual object) are responded to client terminals 131 to 133 of User A. In contrast, in a case in which there is a setting for a contact event in step S1525, then at step S1527, based on the position information of the avatar of User B acquired in step S1524, the position information of the avatar of User A is updated. The CPU 202 of the present embodiment functions as an as event activation unit that activates an event after the avatar of the user has moved to another location within the virtual space. In addition, in a case in which "deny" is received at step S1523, then at step S1529, the virtual object management unit 313 responds with "deny" information to the local virtual object management unit 323 of client terminals 131 to 133 of User A.

Figure 25:
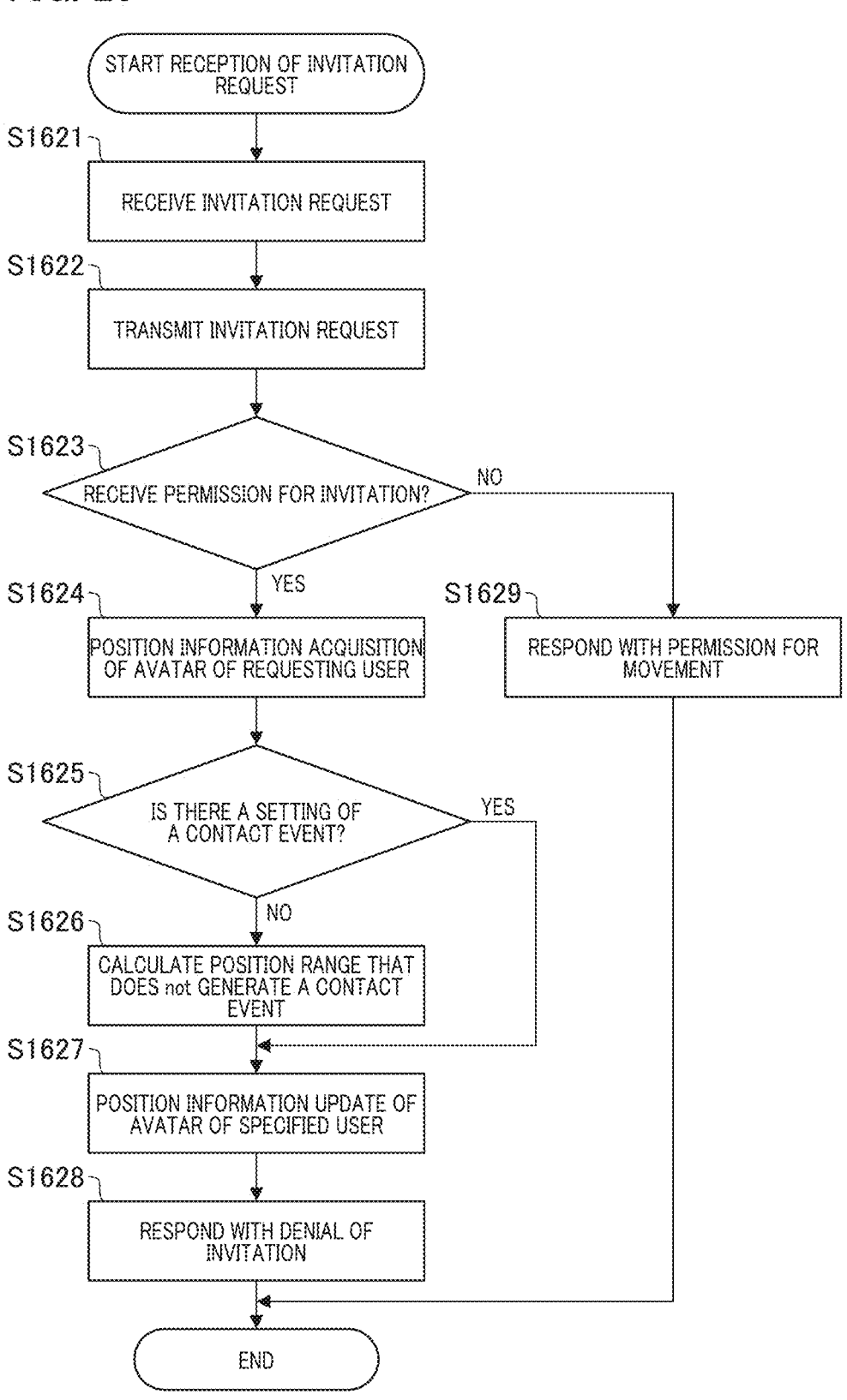
FIG. 25 is a processing flowchart for when an invitation request of an avatar is made from a client terminal to the virtual space management system in the Second Embodiment.

FIG. 25 is a processing flowchart for when an invitation request of an avatar is made from a client terminal to the virtual space management system in the Second Embodiment. Specifically, in the Second Embodiment, it is the processing flow when the virtual space management system 121 receives an invitation request of an avatar from client terminals 131 to 133 of User A in FIG. 12. This corresponds to the processing of the virtual space management system 121 in steps S1109 to S1113 in FIG. 12. Steps S1621 to S1624 are processes equivalent to steps S1221 to S1224 in FIG. 18. At step S1624, position information of the avatar of the requesting user (User A) is acquired. At step S1625, the virtual object management unit 313 checks as to whether there is a setting for a contact event in the invitation request. In a case in which there is no setting for a contact event in step S1625, then at step S1626 a position range that will not generate a contact event for User A is calculated from the position information of the avatar of User A acquired at step S1624. At step S1627, based on the calculated position range in step S1626, position information of the avatar of the specified user (User B) is updated. At step S1628, "permit" for the invitation is responded to client terminals 131 to 133 of User A. In contrast, in a case in which there is a setting for a contact event in step S1625, then at step S1627, based on the position information of the avatar of User A acquired at step S1624, the position information of the avatar of User B is updated. In addition, in a case in which "deny" is received at step S1623, then at step S1629, the virtual object management unit 313 responds with "deny" information to the local virtual object management unit 323 of client terminals 131 to 133 of User A.

By using the above method, it becomes possible to control, based on the decision of the user, as to whether to "activate" or "not activate" a contact event when the user accesses another user via movement or invitation of an avatar.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-051073, filed Mar. 28 2023, which is hereby incorporated by reference wherein in its entirety.

What is claimed is:

1. A system configured to manage a virtual space in which a plurality of user avatars can exist, comprising:

a memory storing instructions; and a processor executing the instructions causing the system to:

receive a first setting that is set by a user of a user avatar, wherein the first setting is to set at least one of a plurality of events that is capable of being activated at the time of movement of the user avatar within the virtual space;

provide a plurality of options for settings related to the movement of the user avatar within the virtual space;

move the user avatar to another location within the virtual space according to a selection from the plurality of options, wherein the plurality of options includes at least a movement setting that specifies a predetermined location, a movement setting that specifies another user avatar, and a second setting by the user to determine whether or not to activate an event at the time of movement of the user avatar to another location;

present the at least one event set in the first setting in the settings related to the movement of the user avatar within the virtual space in a case when the second setting is set to activate the event; and activate the event after the user avatar has moved to the other location, wherein the activated event is the selected event by the user from among the at least one event that has been presented.

2. The system according to claim 1, wherein the processor moves the user avatar to the location of the other user avatar in a case in which permission is obtained from the user of the other user avatar in response to a movement request to the location of the other user avatar.

3. The system according to claim 1, wherein the processor moves the other user avatar to the location of the user avatar in a case in which permission is obtained from the user of the other user avatar in response to an invitation request to the location of the other user avatar.

4. The system according to claim 2, wherein the processor, in a case of a predetermined situation, does not move the user avatar to the location of the other user avatar.

5. The system according to claim 3, wherein the processor, in a case of a predetermined situation, does not move the other user avatar to the location of the user avatar.

6. The system according to claim 4, wherein the predetermined situation is a situation in which the location of the other user avatar is a location to which the user avatar does not have entry authorization.

7. The system according to claim 4, wherein the predetermined situation is a situation in which the user of the other user avatar denies any user avatar from moving to the location of the other user avatar.

8. The system according to claim 4, wherein the predetermined situation is a situation in which the user avatar is included in a list that denies movement to the location of the other user avatar.

9. The system according to claim 4, wherein the predetermined situation is a situation in which the user avatar is not included in a list that permits movement to the location of the other user avatar.

10. The system according to claim 4, wherein the predetermined situation is a situation in which the other user avatar is participating in an event in which the user avatar is set not to participate.

11. The system according to claim 4, wherein the predetermined situation is a situation in which the other user avatar is participating in an event during which the user of the other user avatar has set to deny the movement of any user avatar.

12. The system according to claim 5, wherein the predetermined situation is a situation in which the location of the user avatar is a location to which the other user avatar does not have entry authorization.

13. The system according to claim 5, wherein the predetermined situation is a situation in which the user avatar is participating in an event in which the other user avatar is set not to participate.

14. A control method of a system configured to manage a virtual space in which a plurality of user avatars can exist, the method comprising:

receiving a first setting that is set by a user of a user avatar, wherein the first setting is to set at least one of a plurality of events that is capable of being activated at the time of movement of the user avatar within the virtual space;

providing a plurality of options for settings related to the movement of the user avatar within the virtual space;

moving the user avatar to another location within the virtual space according to a selection from the plurality of options, wherein the plurality of options includes, at least, a movement setting that specifies a predetermined location, a movement setting that specifies another user avatar, and a second setting by the user to determine whether or not to activate an event at the time of movement of the user avatar to the other location;

presenting the at least one event set in the first setting in the settings related to the movement of the user avatar within the virtual space in a case when the second setting is set to activate the event; and activating the event after the user avatar has moved to the other location, wherein the activated event is the selected event by the user from among the at least one event that has been presented.

* * * * *